July 5, 1927.
H. WHITE
1,634,476
SILK DRESSING MACHINE
Filed April 1, 1926     16 Sheets-Sheet 6
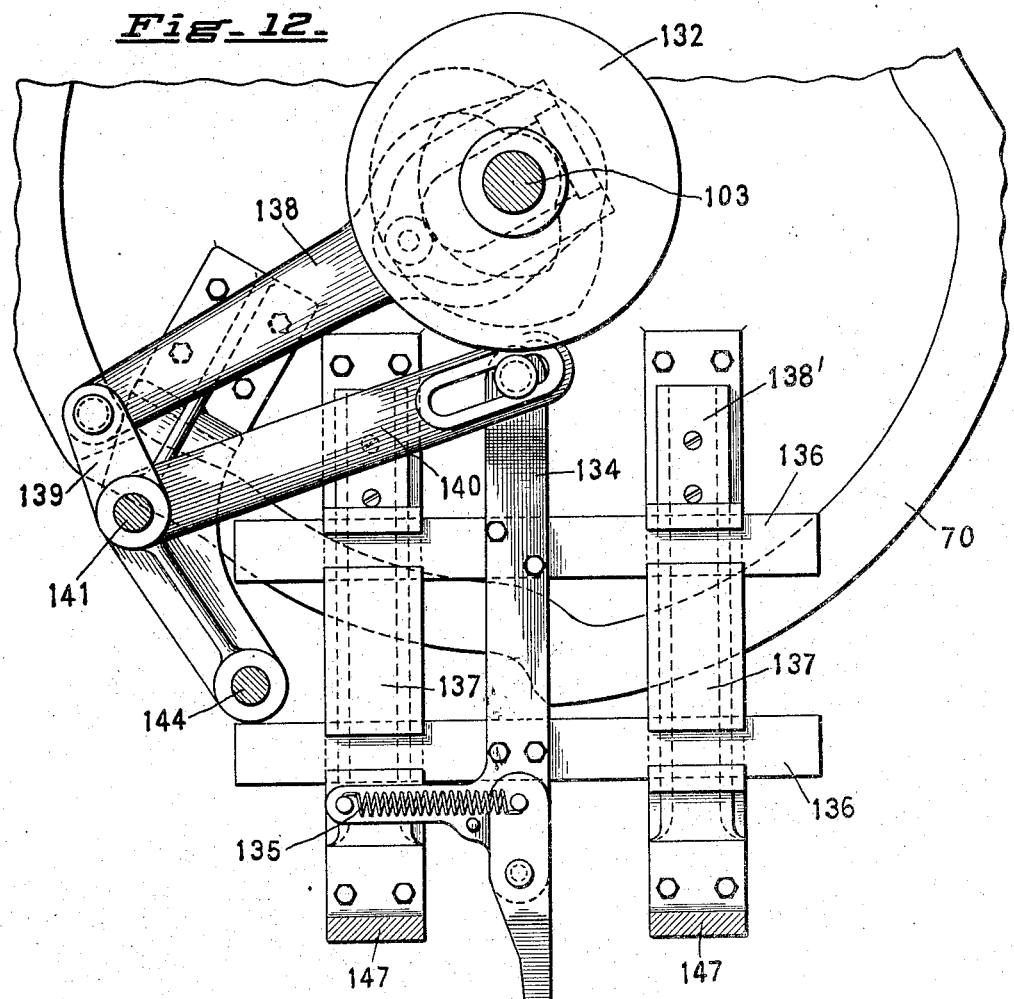
Fig. 12.
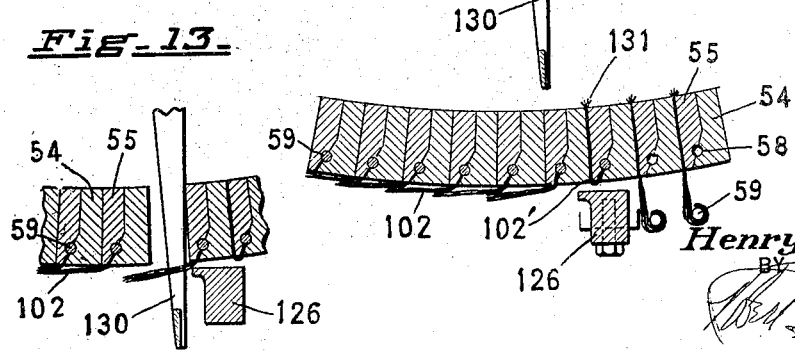
Fig. 13.
INVENTOR
Henry White,
BY
ATTORNEY

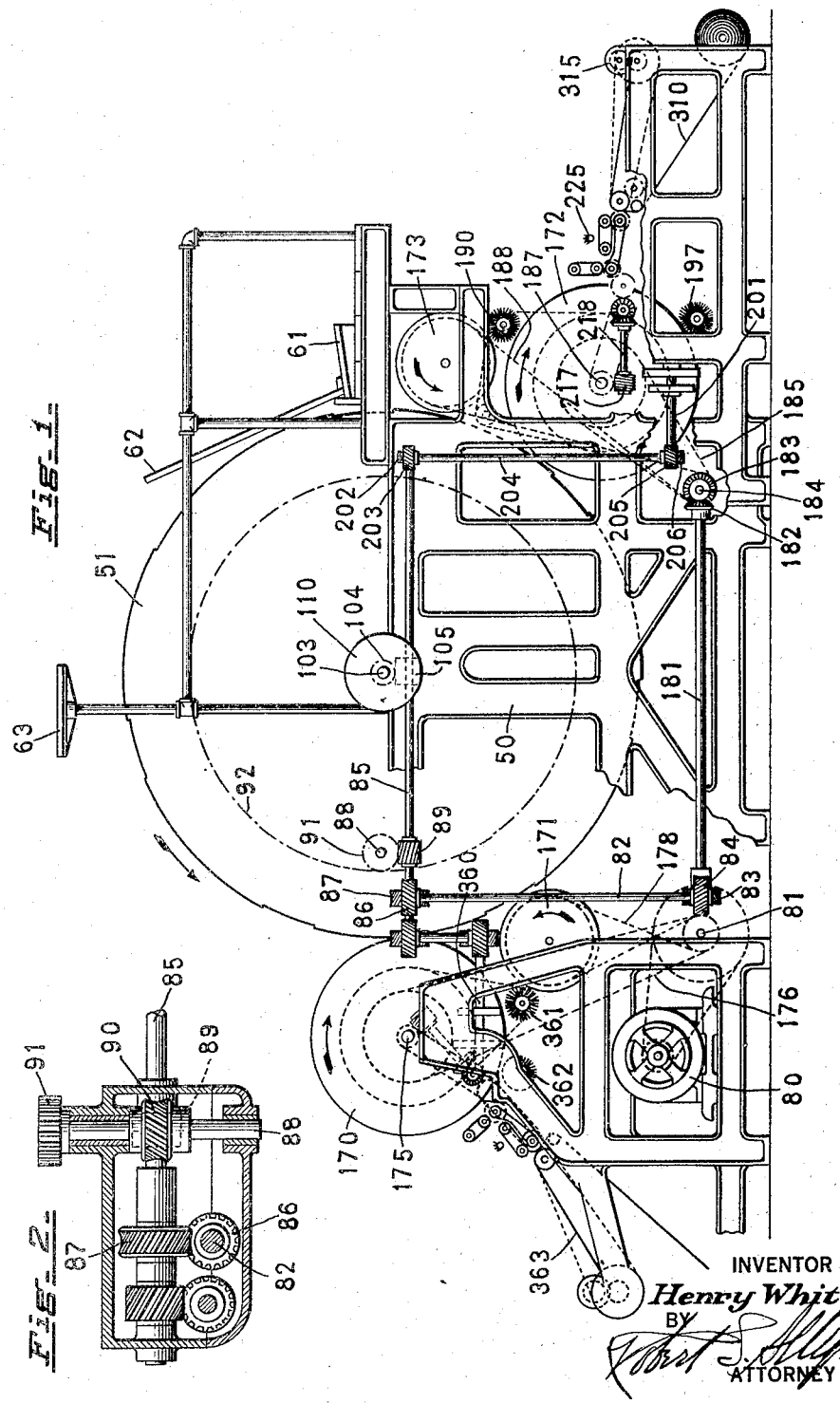

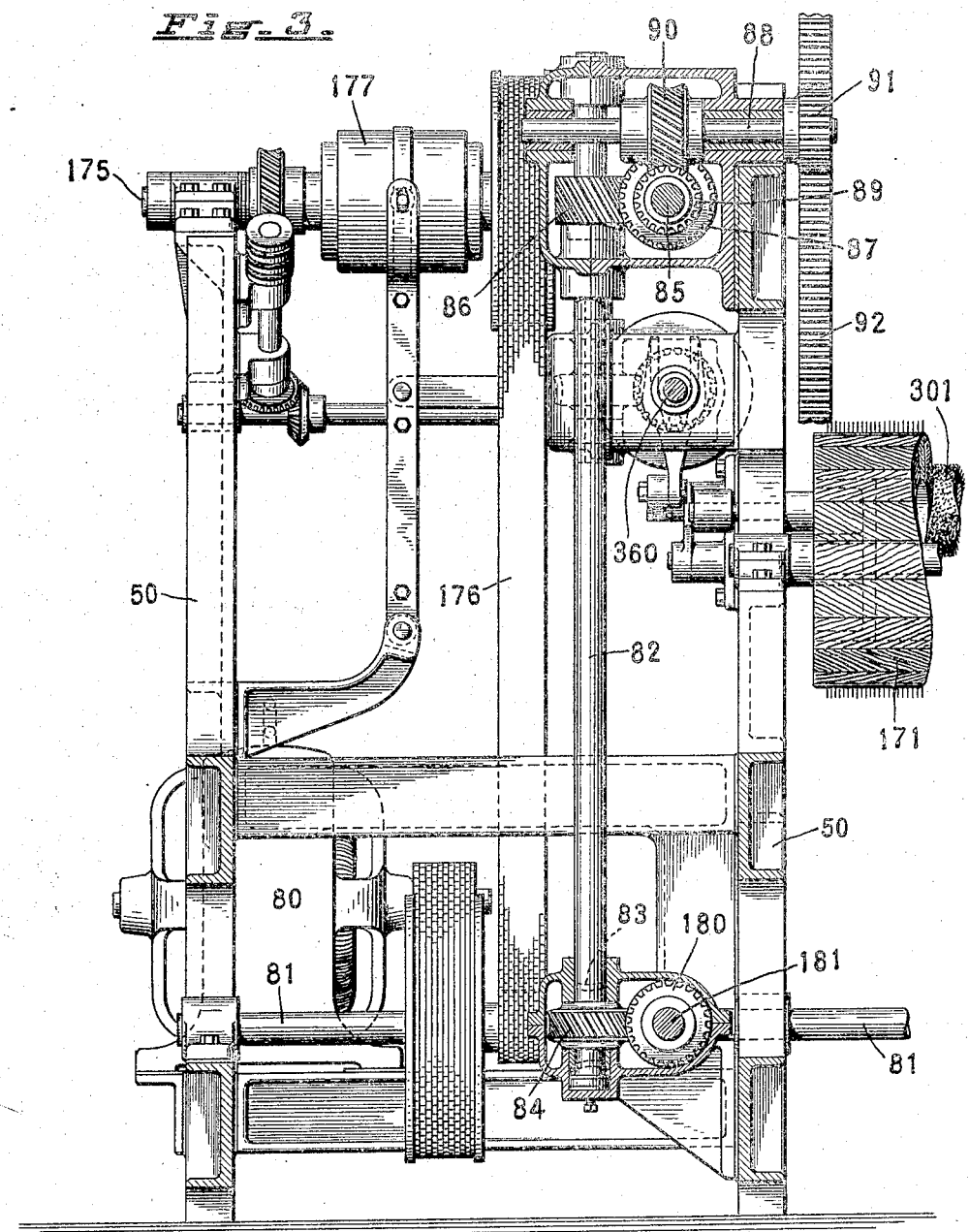

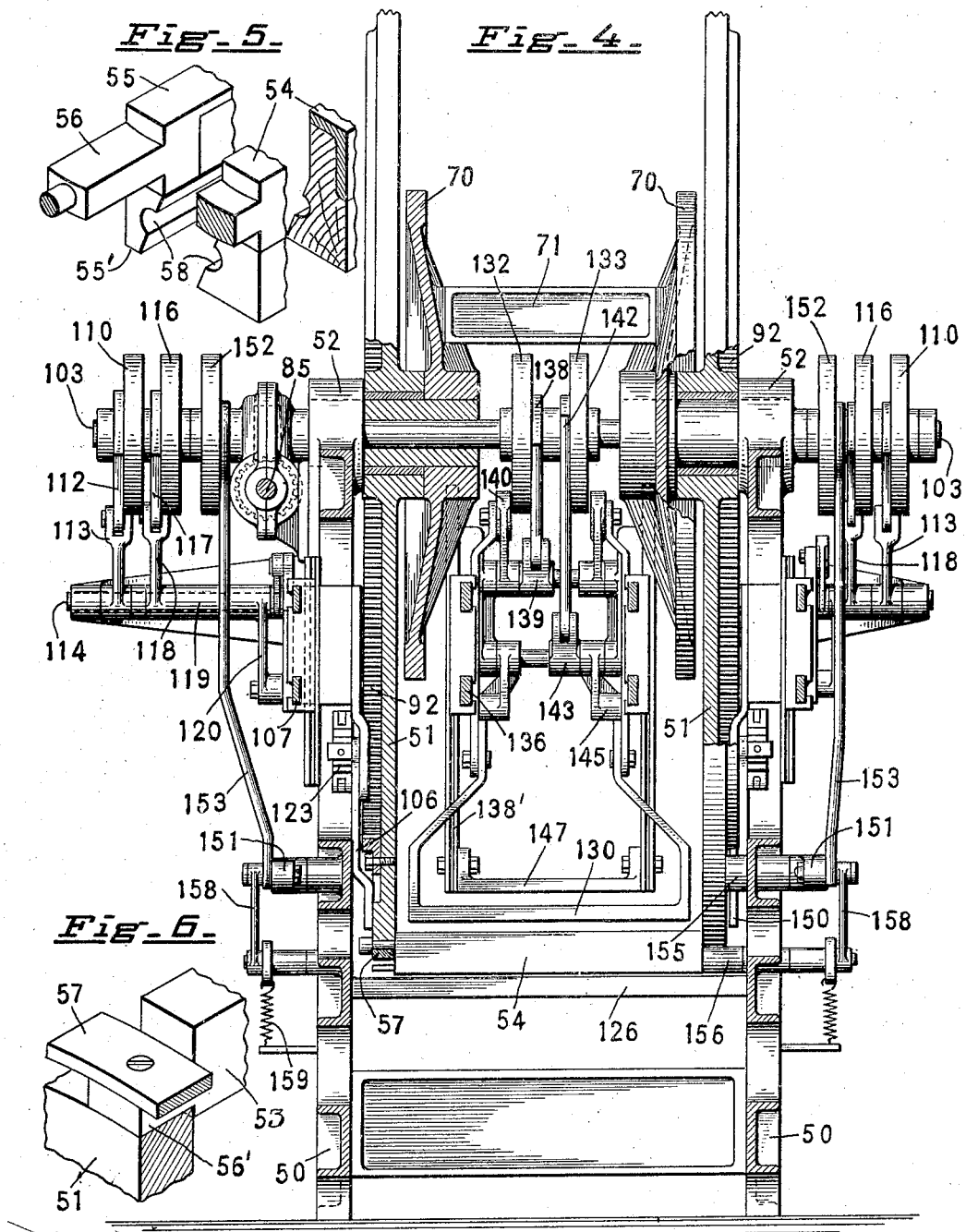

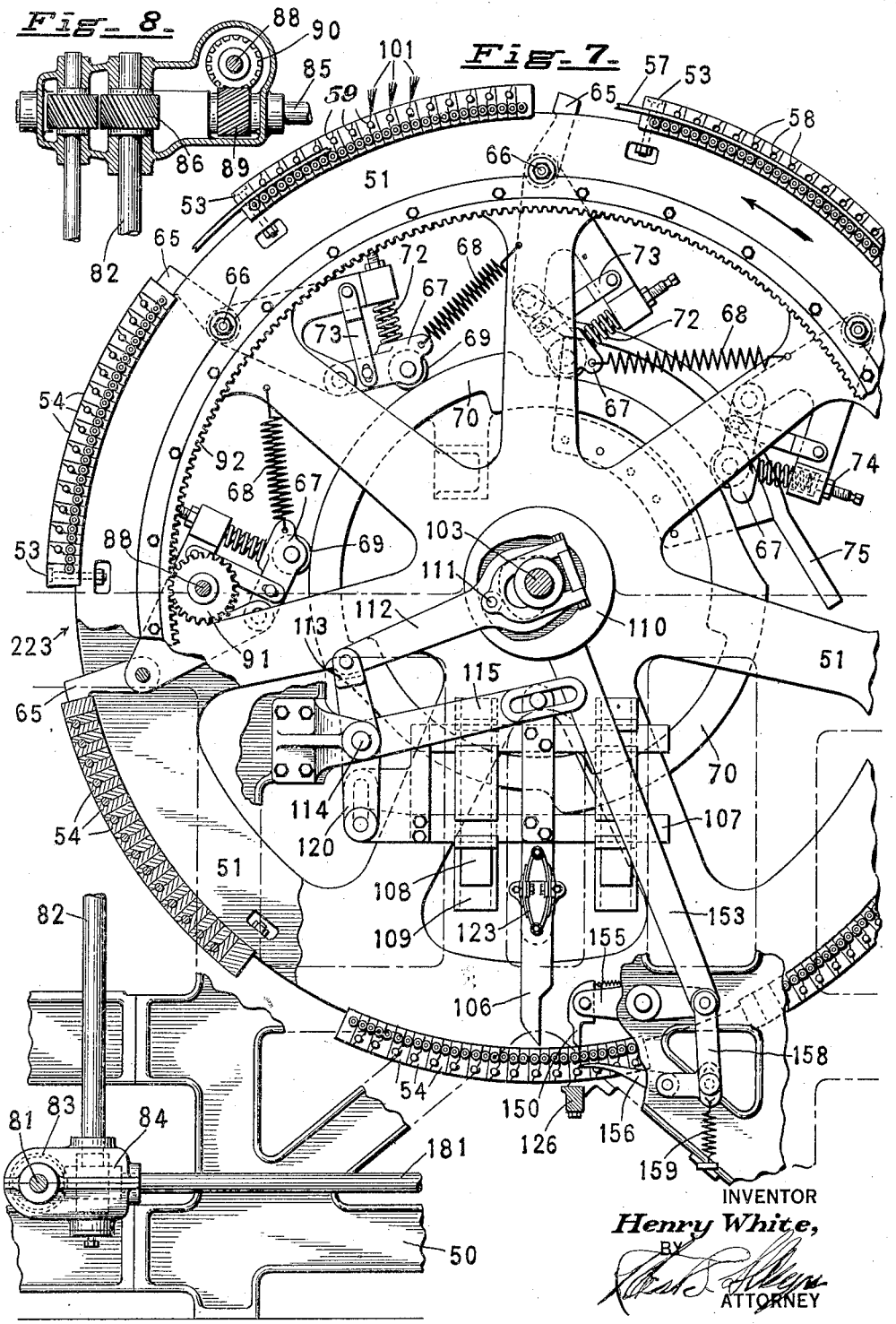

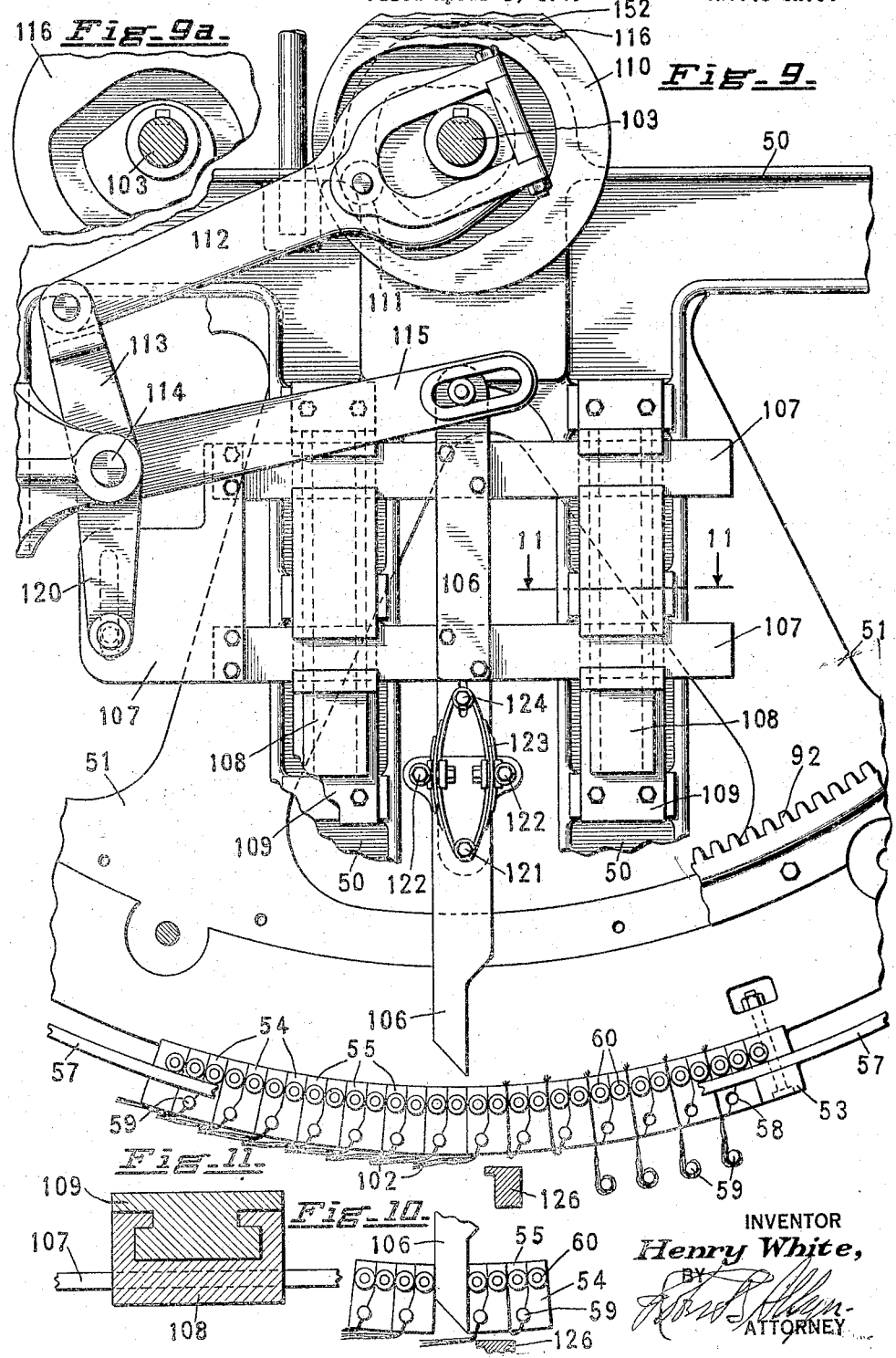

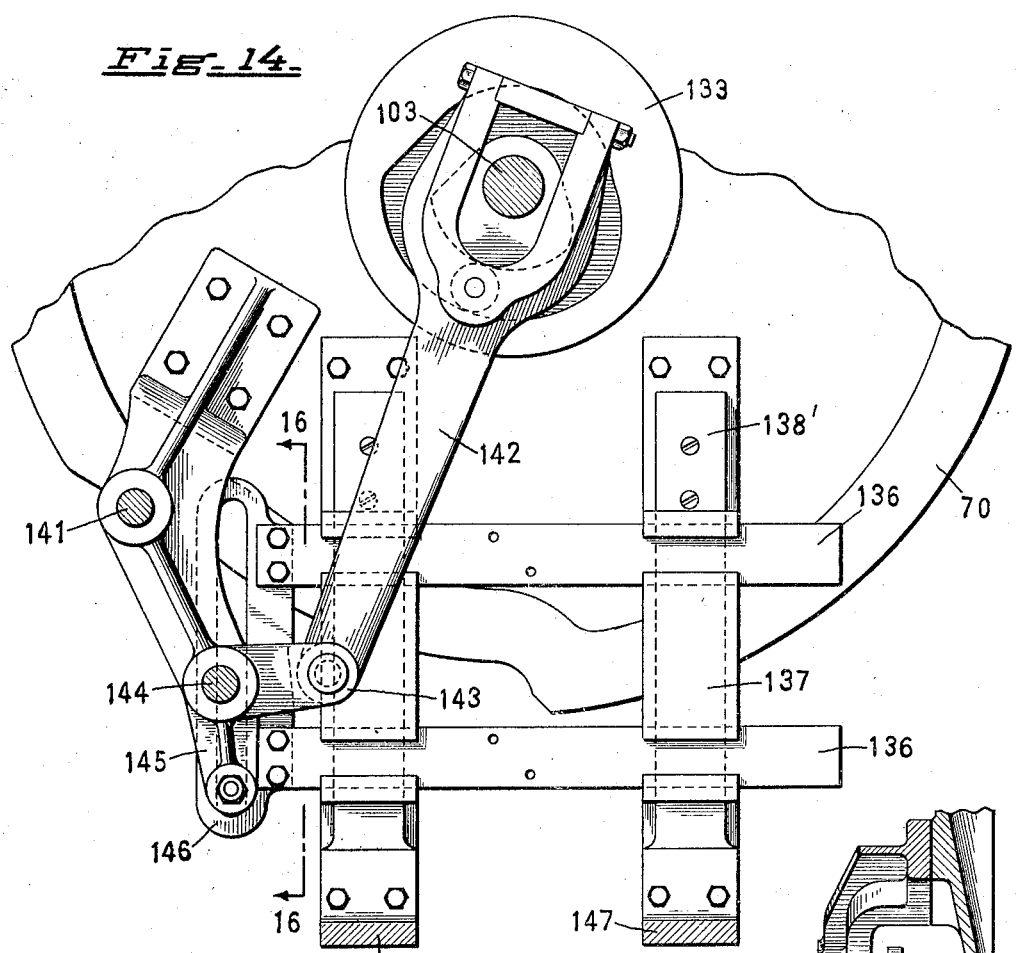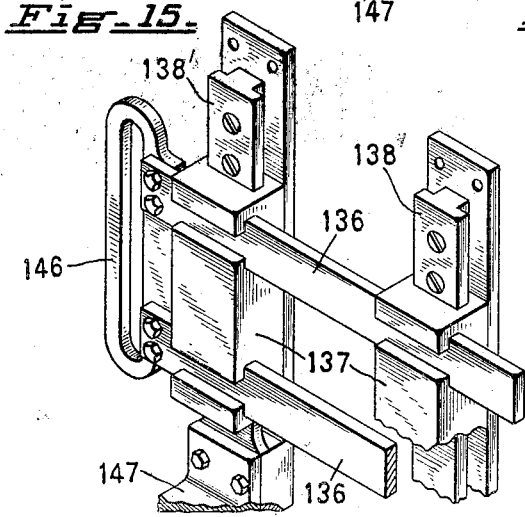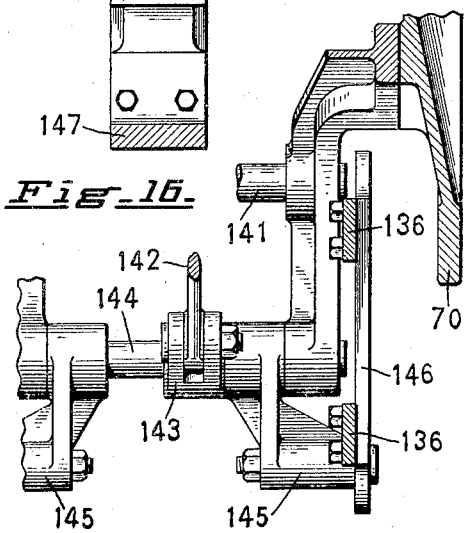

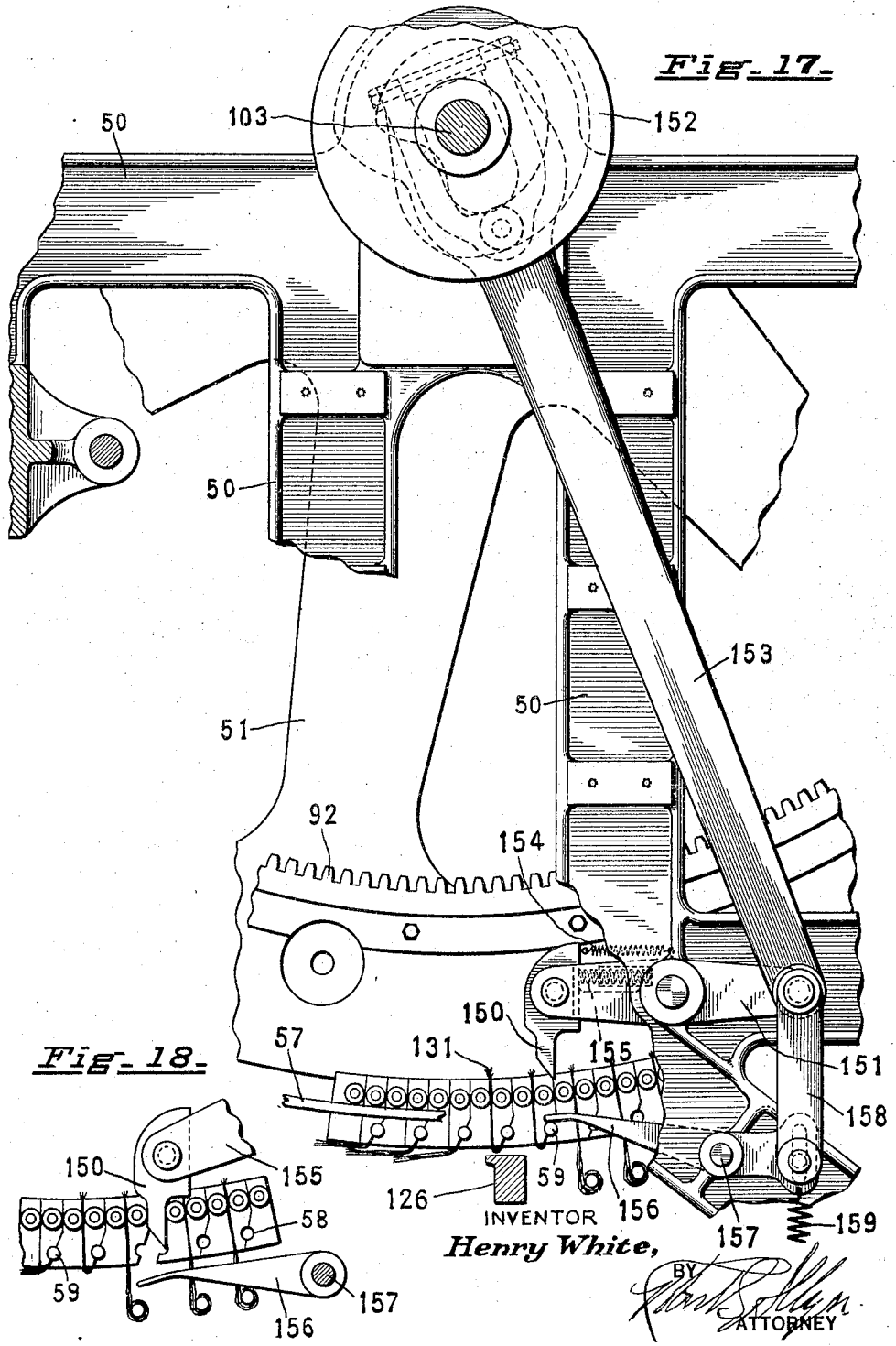

Fig. 19.

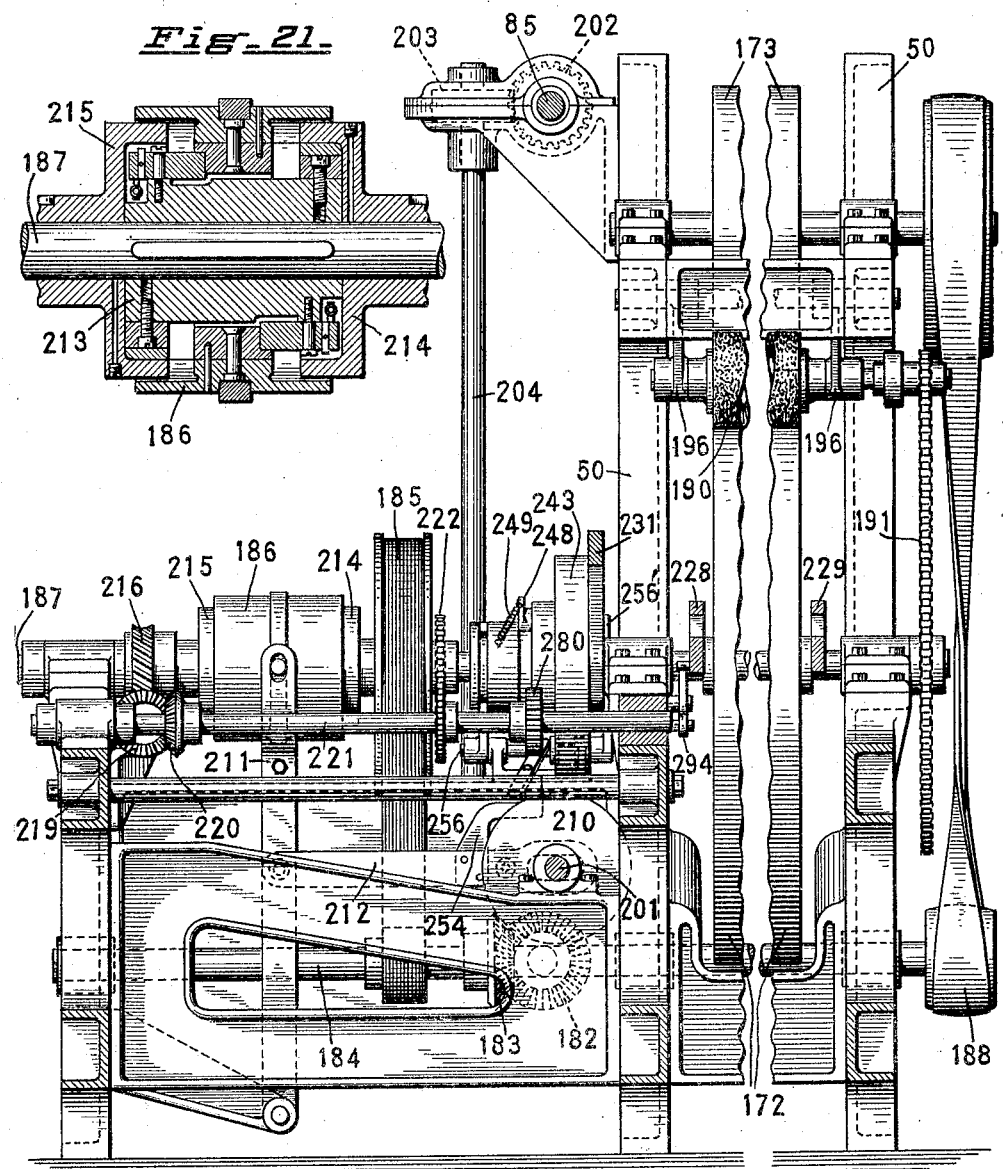

July 5, 1927.
H. WHITE
SILK DRESSING MACHINE
Filed April 1, 1926    16 Sheets-Sheet 11
1,634,476
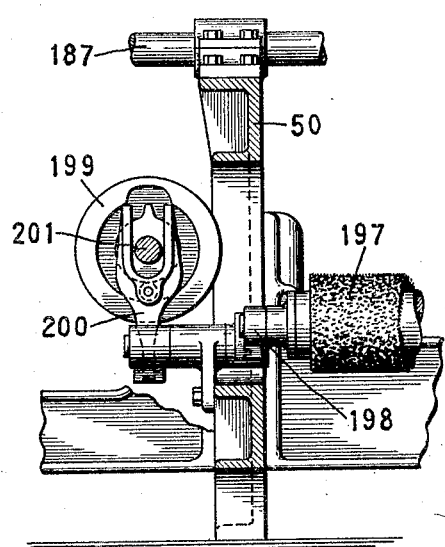
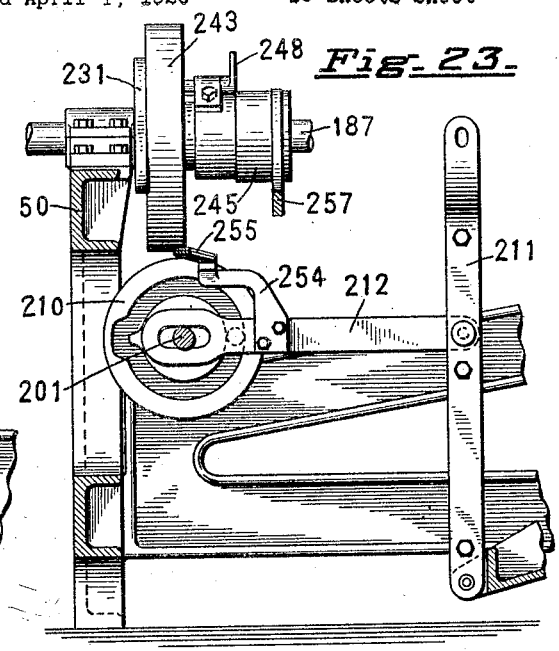
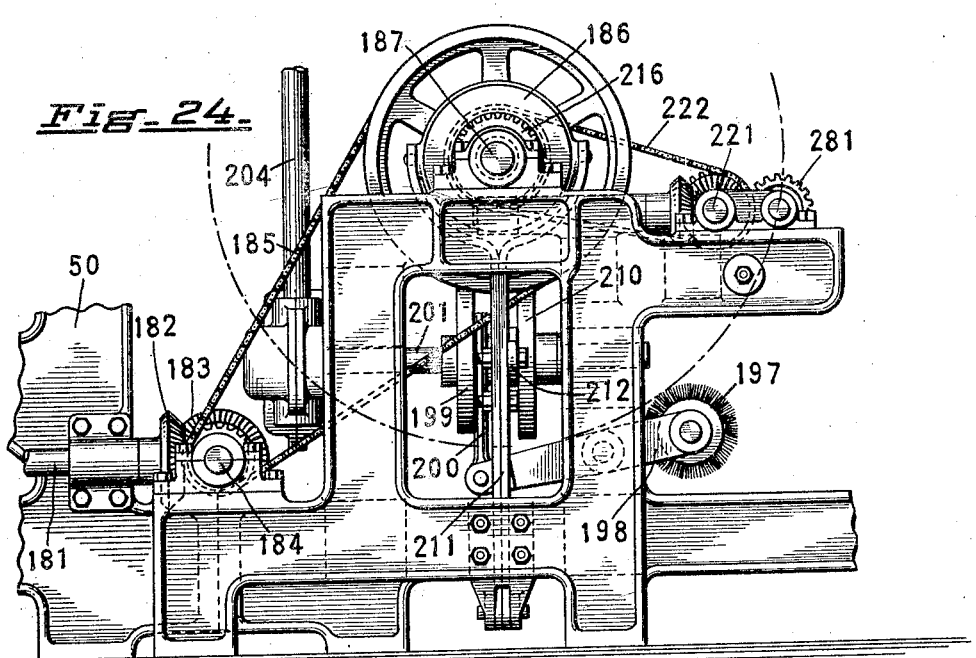
INVENTOR
*Henry White,*
BY
ATTORNEY

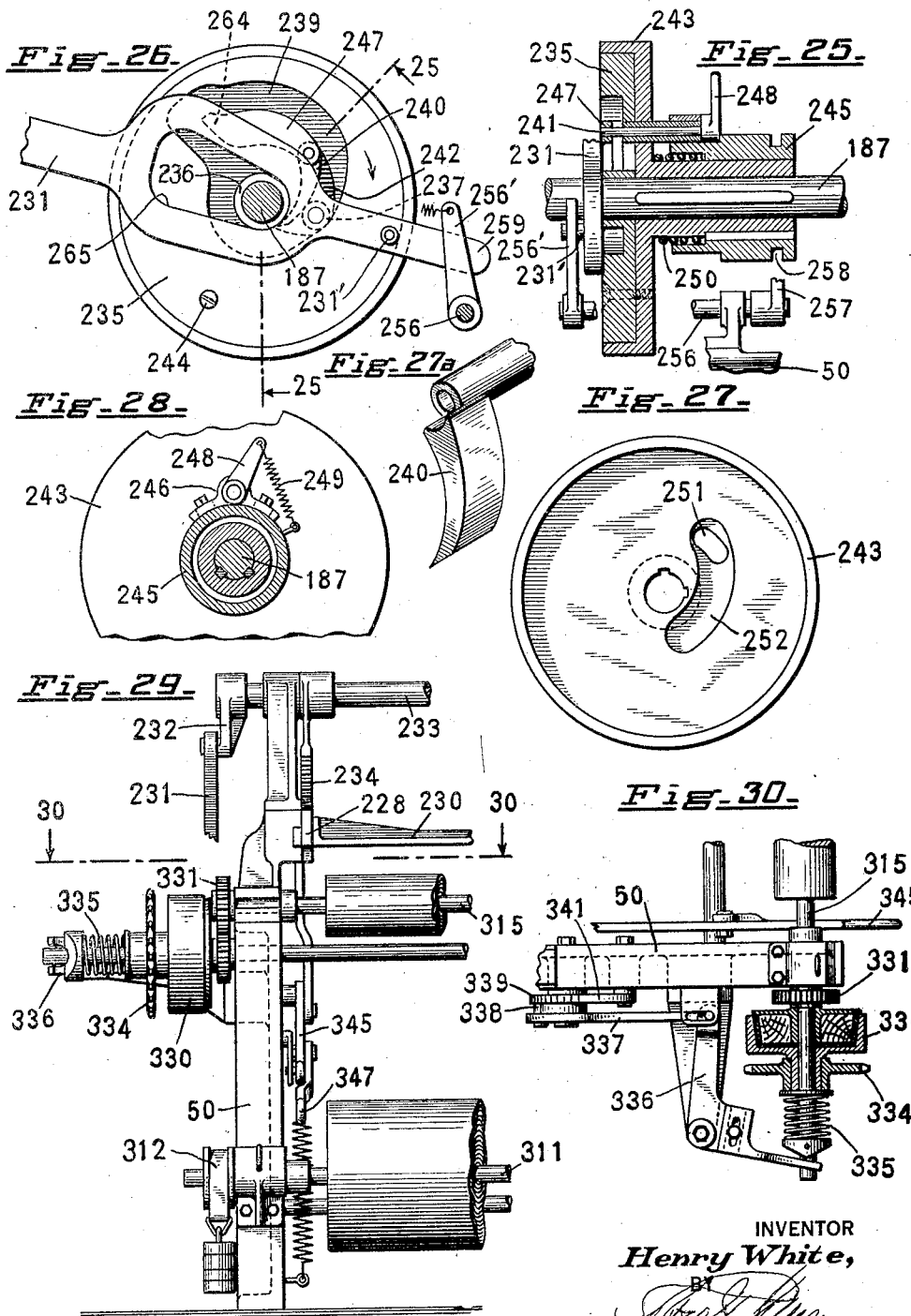

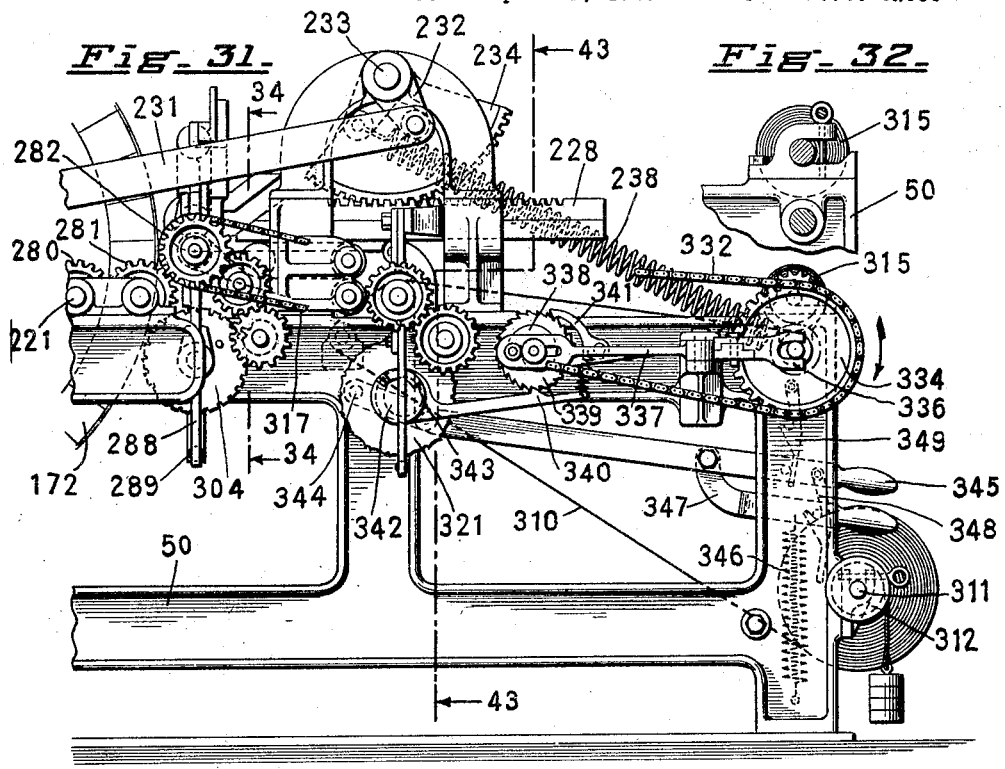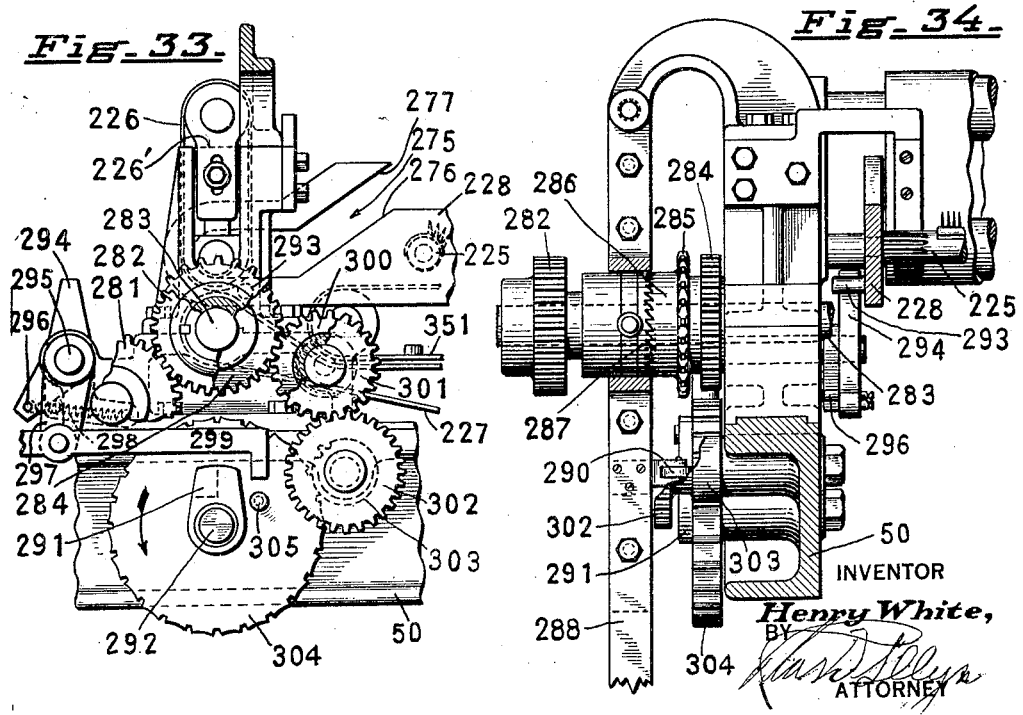

July 5, 1927.
H. WHITE
1,634,476
SILK DRESSING MACHINE
Filed April 1, 1926     16 Sheets-Sheet 14
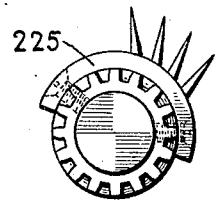
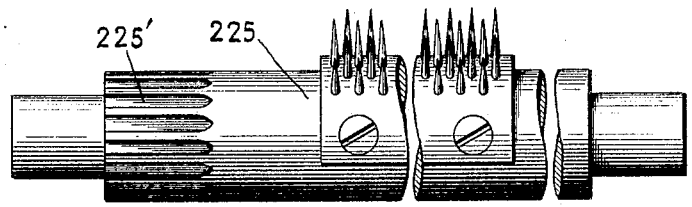
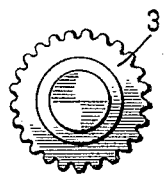
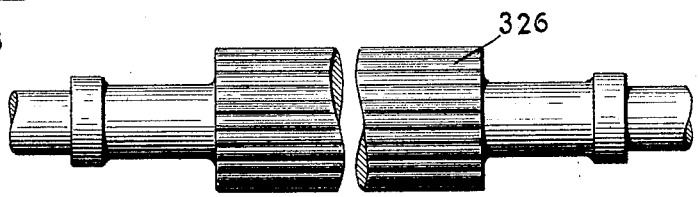
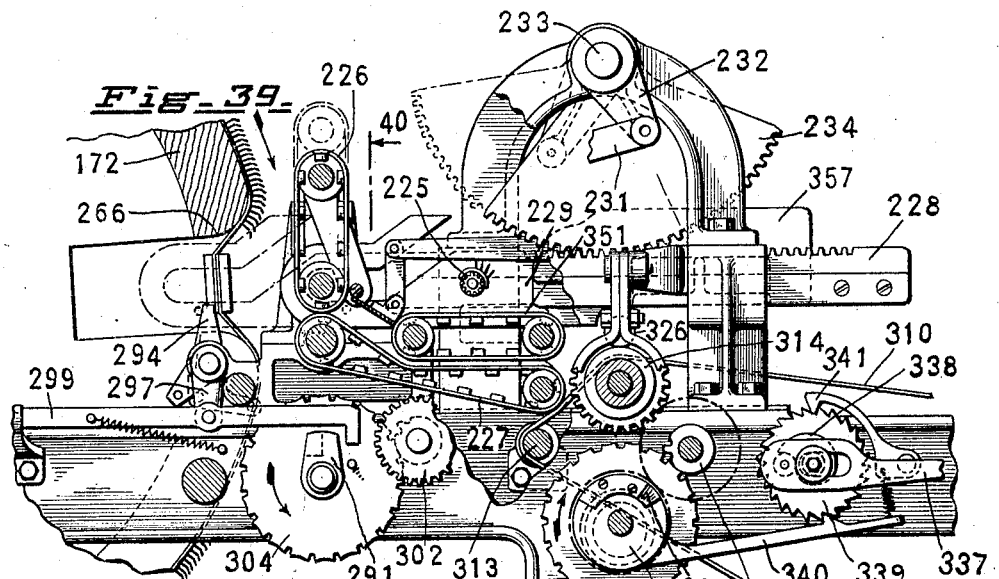
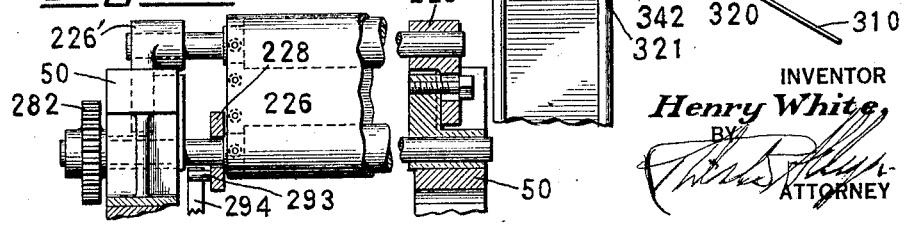
INVENTOR
Henry White,
BY
ATTORNEY

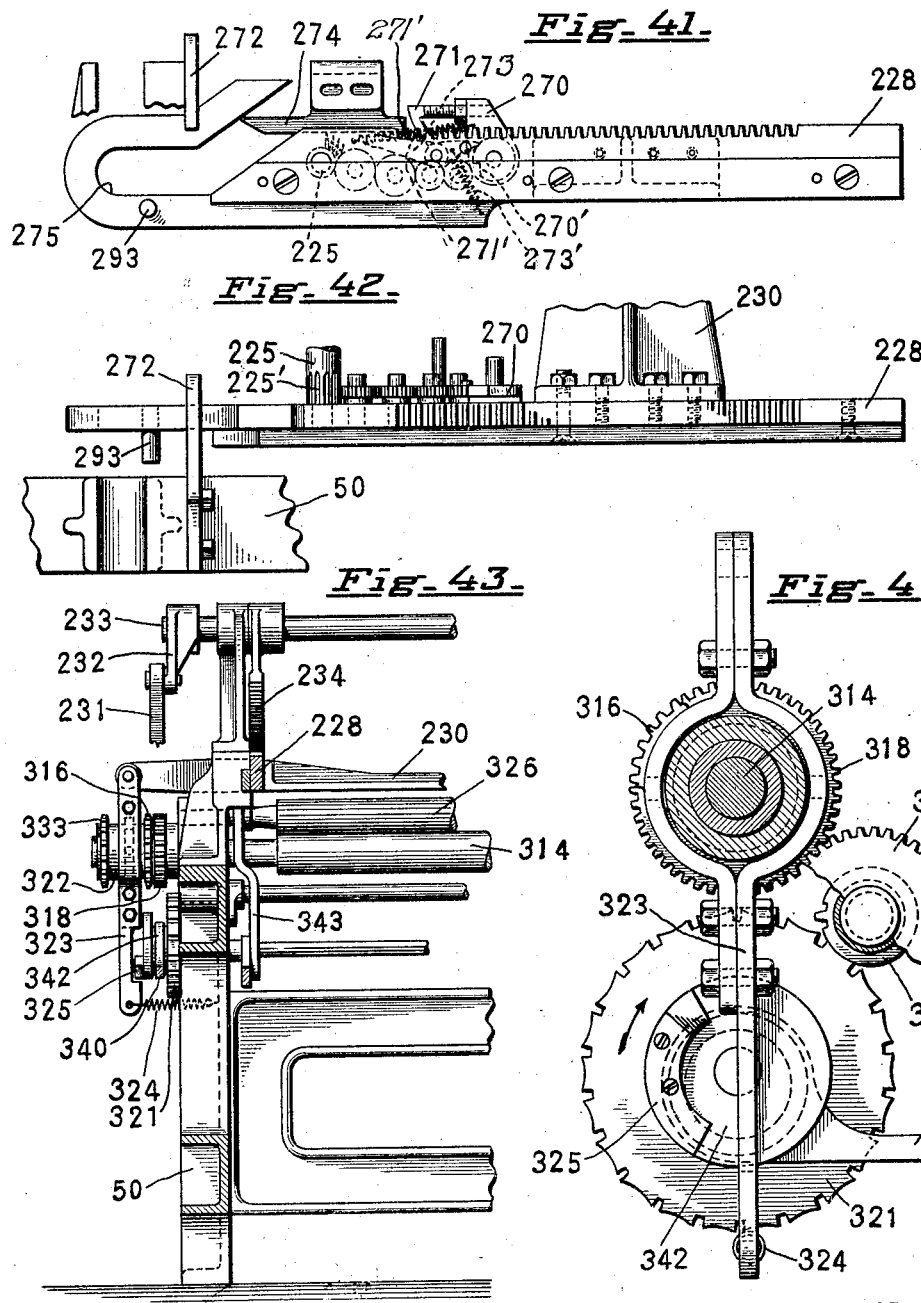

July 5, 1927.

H. WHITE

SILK DRESSING MACHINE

Filed April 1, 1926    16 Sheets-Sheet 16

1,634,476

INVENTOR
Henry White
BY
ATTORNEY

Patented July 5, 1927.

1,634,476

UNITED STATES PATENT OFFICE.

HENRY WHITE, OF GLENS FALLS, NEW YORK, ASSIGNOR TO CHAMPLAIN SILK MILLS, OF NEW YORK, N. Y., A CORPORATION OF NEW YORK.

SILK-DRESSING MACHINE.

Application filed April 1, 1926. Serial No. 99,041.

In the preparation of silk it has been customary in the past to arrange the fibre on sticks in a form commonly termed a fill or fills. These fills are mounted in what is commonly termed a cylinder which carries around its periphery a large number of fills successively arranged. As the cylinder revolves the silk is combed by what is termed a card drum so that the fibres are straightened out and most of the foreign particles in the fills removed. The fills are supported in the cylinder by sliders so that, of course, only one end of each fill is exposed for treatment. The exposed ends of the fills are first combed on one side and then on the other during one rotation of the cylinder. When the cylinder has completed one rotation the operator removes the fills, turns them over and clamps them between the sliders, leaving the sticks attached to what are now the outer ends of the fills. These sticks are then removed and what are then the outer ends of the fills are combed first on one side and then on the other. The sliders are arranged in groups so that when the carding is completed the fills of each group, when released from the cylinders, constitute what are called flags. These flags are removed from the cylinder by hand, folded up, and placed in a can or other receptacle in which they are taken to the picking department where they are inspected.

After having been inspected and picked, the flags are run through a spreading machine which draws out the flags into what is termed a sliver. The silk which has been collected at the card roll according to the customary practice is stripped from the card rolls after a certain amount has been collected. The product of this roll is called a lap and is usually tied in a knot. These knots are again put through the filling machine for the formation of fills and treatment as before.

One object of my invention is to increase the production of machines of this character.

Another object is to automatically turn over the fills so as to eliminate the hand operation and its inaccuracies and also to simplify the operation so that the machine will not require the same degree of skill in its operation.

Another object is to automatically strip the lap from the card drum.

Another object is to form a continuous sheet of laps and thus do away with the knotting and rehandling of the material before it is filled.

Another object is to reduce the number of operatives required for a given production.

According to my invention I provide special sliders adapted to support the usual fills. These sliders are mounted in a cylinder or drum and the fills with their sticks are inserted in the sliders by hand in the usual manner. The sliders are arranged in groups and the fills are combed first in one direction and then in the other by a pair of card rolls. One card roll is larger than the other and the carding from the smaller roll is automatically transferred to the larger roll. After the outer ends of the fills have been combed the sliders are separated automatically and the free ends of the fills are drawn in between the sliders. The sticks are then released and discharged so as to expose what was the inner ends of the silk. This action corresponds to the usual hand turning operation. The ends of the fills which have just been released are then automatically combed, first on one side and then on the other, by a pair of card rolls similar to those first mentioned. After the second end of each fill has been carded the groups of fills forming flags are removed and inspected and treated in the usual manner.

The opposite ends of the machine are provided with stripping mechanism for automatically removing the laps from the card rolls and winding them up into balls or rolls with strips of canvas.

This pull out mechanism consists of a picker which is brought into action to grip the lap on the card roll and draw it out between two take off aprons. One of these aprons is movable to clear the picker and the other apron carries the front end of the lap into a position to be gripped by another horizontal apron. These two horizontal aprons carry the lap to a strip of canvas which conveys the laps from the machine and winds them up in a ball or roll. Details of the construction by which the various parts are started and stopped from time to time as required will be understood from the following specification.

I will not attempt to describe in detail various constructional parts of a conventional nature or those details which will be within the knowledge or information of the man familiar with this art, for I anticipate that many changes may be made in the construction and arrangement of the parts and that mechanical equivalents may be substituted for various mechanisms for performing the necessary essential operations.

Fig. 1 is a side view, largely diagrammatic, of one form of machine embodying the improvements of my invention and showing the power transmission mechanism.

Fig. 2 is a detail plan view and section of part of the transmission at the left of the center in Fig. 1.

Fig. 3 is a vertical projection and section showing the motor drive and parts adjacent thereto.

Fig. 4 is a transverse, vertical, sectional view of the main cylinder or drum in which the dressing of the silk takes place.

Fig. 5 is a fragmentary sectional view showing one end of a slider and the method of mounting it on the main cylinder.

Fig. 6 is a fragmentary detail view showing the method of securing the header bar to the main cylinder.

Fig. 7 is a side view showing parts of the main cylinder on a larger scale than Fig. 1, parts being broken away and other parts being shown in section.

Fig. 8 is a side view and partial section of the transmission parts shown in Fig. 2.

Fig. 9 is a fragmentary side view on a still larger scale showing the mechanism for separating the pairs of sliders.

Figure 45:
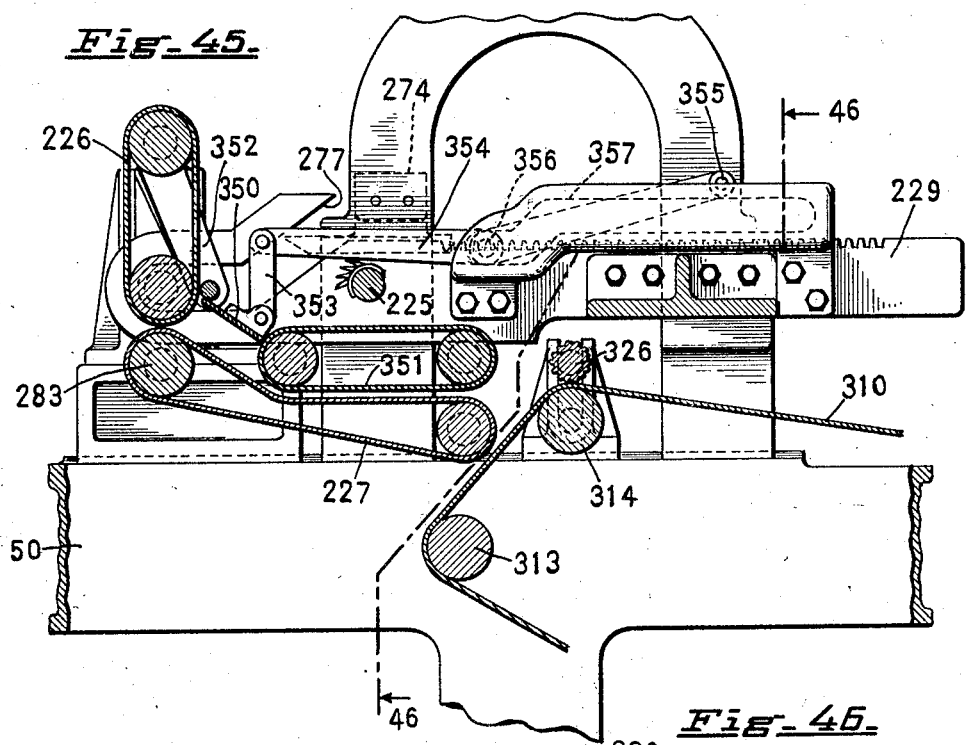

Fig. 9ª is a detail of the cam.

Fig. 10 is a fragmentary detail showing pairs of sliders being separated.

Fig. 11 is a fragmentary horizontal sectional view on the plane of the line 11—11 in Fig. 9.

Fig. 12 is a fragmentary side view of that part of the mechanism for turning the fills which provides the vertical motion.

Fig. 13 is a fragmentary view showing the turning action.

Fig. 14 is a fragmentary side view of that part of the turning mechanism which affords horizontal movement.

Fig. 15 is a perspective view of the vertical and horizontal guides of the turning mechanism.

Fig. 16 is a fragmentary sectional view on the plane of the line 16—16 in Fig. 14.

Fig. 17 is a fragmentary side view of the mechanism for releasing and discharging the sticks.

Fig. 18 is a fragmentary side view showing the action of the releasing discharging mechanism.

Figure 19:
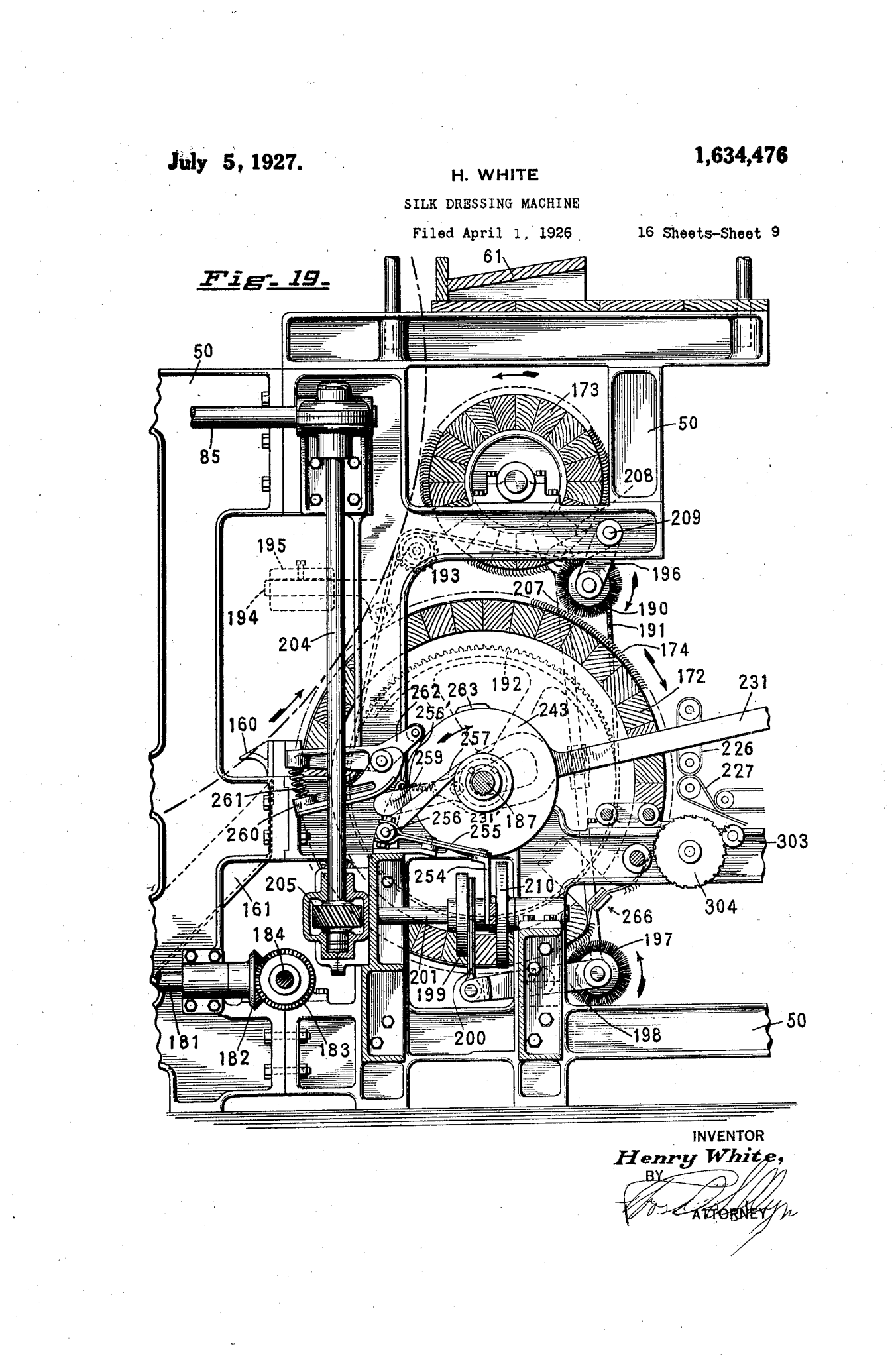

Fig. 19 is a side view and partial section showing the combing mechanism and associated details at the right-hand end of the machine (with respect to Fig. 1).

Fig. 20 is a partial transverse sectional view and vertical projection of the parts shown in Fig. 19.

Fig. 21 is a detail sectional view of one of the reversing clutches.

Fig. 22 is a transverse section and vertical projection showing a part of a packing brush and mechanism for operating it.

Fig. 23 is a transverse section and vertical projection showing the clutch shifting mechanism of Fig. 24.

Fig. 24 is a side view of the parts shown in Figs. 22 and 23, and also showing parts which are shown in Fig. 19.

Fig. 25 is a fragmentary sectional view showing part of the mechanism for operating the pull-out.

Fig. 26 is an end view of the parts shown in Fig. 25.

Fig. 27 is a detail view of the housing shown in Fig. 25.

Fig. 27ª is a perspective view of the pawl of Figs. 25 and 26.

Fig. 28 is a fragmentary detail showing the operating pawl of Figs. 25 and 26.

Fig. 29 is a fragmentary end view and vertical projection taken from the extreme right-hand end of the machine of Fig. 1.

Fig. 30 is a plan view and horizontal section on the plane of the line 30—30 in Fig. 29.

Fig. 31 is a side view of the parts at the right-hand end of the machine on the same scale as Fig. 29.

Fig. 32 is a fragmentary side view of the final winding roll.

Fig. 33 is a side view of the mechanism for timing the action of the take-off aprons.

Fig. 34 is a transverse sectional view of the parts shown in Fig. 33, the section being generally on the plane of the line 34—34 of Fig. 31.

Figs. 35 and 36 are detail views of the pull-out gripper or comb.

Figs. 37 and 38 are detail views of a fluted roll for holding back the canvas and silk.

Fig. 39 is a side view and vertical section showing the take-off aprons, the pull-out mechanism, and the winding canvas.

Fig. 40 is a fragmentary detail view of one of the take-off aprons and its method of support, the section being taken in the direction of the arrow 40 in Fig. 39.

Figs. 41 and 42 are side and plan views, respectively, of one of the pull-out racks and adjacent parts.

Fig. 43 is a vertical section and end elevation on the plane of the line 43—43 in Fig. 31.

Fig. 44 is a side view and partial section showing the clutch operating mechanism of Fig. 43 on a larger scale.

Fig. 45 is a vertical section and side view of part of the take-off mechanism but on a larger scale than Fig. 39.

Figure 46:
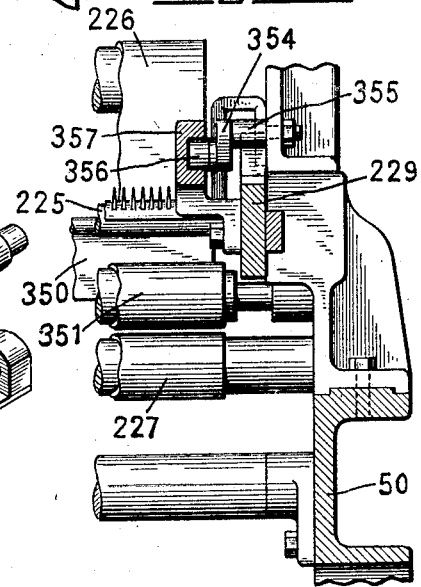

Fig. 46 is an elevation and transverse section on the plane of the line 46—46 in Fig. 45.

Figure 47:
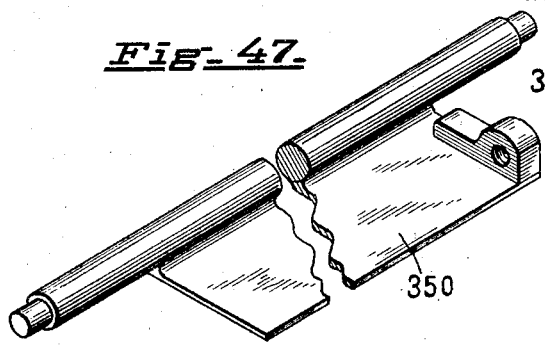

Fig. 47 is a perspective view of the tucker.

The reference numeral 50 will be used to designate the frame of the machine except when some special form of construction is required. The main cylinder has two skeleton like discs 51 mounted on bushings 52 which are supported in the side frames of the machine. These discs 51 are connected by a series of headers 53 which have ends 56' are bolted to the rim of the discs as shown in Figs. 6 and 7. The sliders or clamping bars 54 and 55 are arranged in pairs and each slider has a projecting stud 56 which rests on the periphery of the disc 51 and is held in place by a band or ring 57, there being sufficient space between the band and the disc to permit the sliders to work freely. The sliders are constructed so as to provide a recess 58 near the outer surface and nearer one edge than the other to receive and clamp the sticks 59 to which the fills of silk are attached. The discs 51, bands 57 and sliders 53 constitute the carrier for the sliders 54 and 55, which, in turn, carries the fills of silk. Each slider is also provided with a roller 60 on its outer end for co-action of the opening and separating mechanism which will be hereinafter explained. The operator who handles and inserts the fills and removes the flags stands on the platform 61 and leans against a support 62. A shelf 63 is usually provided for the sticks being handled.

The groups of sliders are yieldingly pressed together by tighteners on opposite sides of the machine. Each tightener consists of a lever 65 which is pivoted at 66 to one of the main discs 51. This lever has three arms, one of which is adapted to press against the sliders, and the other two arms extend inwardly. A link 67 is hinged to one of the inner arms of the lever 65 and connected by a tension spring 68 to the disc. This link 67 carries a roller 69 which is adapted to travel on a stationary cam 70. The two cams may be connected by a cross bar or tie 71 for reinforcing the same. A spring 72 is interposed between the movable end of the link 67 and the other arm of the lever 65 so that the spring 72 tends to press the roller 69 against the cam 70. The inward movement of the link 67 and the roller 69 is limited by a link 73. The pressure of the spring 72 may be adjusted by a nut 74. A shoe 75 serves as an internal cam opposite one of the low spots of the cam 70 for engaging the rollers 69 as they pass upwardly (at the right of Fig. 7) so as to retract the pressure lever 65 from the sliders. As the dressing cylinder rotates left handed as viewed in Fig. 7 it will be seen that each roller 69 is forced outwardly as it reaches the high spots on the cam 70 so as to press the sliders together. In view of the fact that the total circumferential distance kept by the sliders of a group varies with the thickness and disposition of the fills I have provided the springs 72 which ensure a proper grip or clamping action of the lever 65 and at the same time allows for variations in thickness of the fills.

The driving of the main dressing cylinder may be effected in any suitable manner. For convenience and efficiency I have provided a single source of power such as a motor 80 for driving the principal parts of the machine including this main cylinder. The shaft of the motor 80 is connected by a belt to a pulley on the shaft 81 as shown in Fig. 1 which shaft extends across to the opposite side of the machine. There is a vertical shaft 82 on each side of the machine which is driven from the cross shaft 81 by spiral gears such as 83 and 84. A horizontal shaft 85 is driven from the vertical shaft 82 by means of spiral gears 86 and 87. A stud shaft 88 which is supported in the frame is driven from the shaft 85 by worm gears 89 and 90. On the inner end of the stud shaft 88 is a pinion 91 which meshes with an annular gear 92 on the outside of the cylinder disc 51. It will thus be seen that the main dressing cylinder or slider carrier is driven continuously by the application of power to the annular gears 92 on the opposite discs 51.

The fills are made up in the usual manner, consisting of sticks 59 having ends of the silk fibre 101 wrapped around the sticks. The outer ends are combed during the passage of the sliders and fills from the upper part of the carrier cylinder downwardly and toward the left, as viewed in Fig. 7, so that after the ends have been combed they will lie over-lapping each other, as shown at 102 in Fig. 9.

The combing of the fills may be effected by mechanism such as has been used in the past. I prefer, however, to use the special mechanism which will be hereinafter described.

The automatic operation of the sliders for the purpose of reversing or turning over the fills is controlled from the transverse shaft 103 which has bearings in the sleeves 52. This transverse shaft 103 has on it a spiral gear 104 which meshes with another spiral gear 105 on shaft 85 at the side of the machine. The opener 106 has its lower end beveled, as shown in Fig. 9, so that it can be forced downwardly between the ends of two adjacent sliders, as shown in Fig. 10, to separate them. As the carrier cylinder is rotating continuously, it is necessary to provide not only a vertical movement for the opener but a horizontal movement so that it may follow the rotation of the carriage. For this purpose the opener is secured to a slide which has a compound movement. This slide consists of a horizontal frame 107 guided in bars 108 which slide on stationary guide-ways 109. The vertical movement of the opener is effected by a cam 110 and roller 111 carried by link 112, the lever 113 fixed to one end of shaft 114 and the slotted arm 115 which is fixed to the inner end of the shaft 114 and engages the upper end of the opener bar 106. The cam 110 is shaped so as to oscillate the arm 115 and the opener bar 106 periodically as the pairs of sliders follow each other sequentially. The horizontal movement of the opener is effected through the cam 116, link 117, and lever 118 similar to link 112 and lever 113. The lever 118 is secured to the outer end of the sleeve 119 which carries an arm 120 at its inner end. This arm 120 has a pin and slot connection with horizontal frame 107, as shown in Fig. 9. To permit of slight variations in the position of the opener 106 due to irregularities in the disposition to the sliders, I have constructed the opener 106 so that it is permitted a relative movement circumferentially with respect to the cylindrical carrier. This is effected by pivoting the lower part of the opener at 121 to the upper part of the opener. The lower part of the opener carries two spaced studs 122 at its upper end between which are mounted spring leaves 123 which are connected by the pin 124 guided in a slot in the lower end of the upper part of the opener. The lower ends of the spring leaves 123 are secured or pressed against the pivot pin 121 thus permitting the lower end of the opener 106 to have a resilient action and yet normally being mounted in the definite position with respect to the carrier frame 107.

A transverse abutment bar 126 extends across the inside of the frame of the machine adjacent the lower part of the cylinder or carrier so as to bend over the outer ends of the fills as they pass over the abutment bar.

While the openers 106 on the opposite sides of the machine are holding adjacent sliders separated, as shown in Figs. 10 and 13, a turn-over member 130 is moved downwardly between the separated sliders into the position shown in Fig. 13, and then retracted so as to draw up the ends of the fills between the sliders, as shown at 131. This action of the turn-over member 130 is controlled by cams 132 and 133. Cam 132 controls the vertical movement of the turn-over member and cam 133 controls the horizontal movement. The turn-over member is pivotally secured to the vertical bar 134 and normally held in tension by the spring 135. Bar 134 is secured to horizontal frames 136 which are guided in the vertical slides 137 which slide on the guide-ways 137'. The vertical action of the turning member is effected through the links 138, crank 139, and slotted arm 140, the crank 139 and arm 140 being secured to the shaft 141. The horizontal movement of the turning member is effected by the cam 133 through the medium of the link 142, cranks 143, shaft 144, and crank 145 which is connected to the slotted member 146, secured to the frame 136. The relative location of the sliders, the turn-over member 130, and the abutment 126 is such that as the slider carrier rotates, the turn-over member 130 moves downwardly between the adjacent sliders, as shown in Fig. 13, the abutment member 126 bends over the outer ends of the fills 102, the turn-over member picks up the outer ends of the fills and draws them between the sliders as the slider carrier rotates. When the opener 106 is retracted, the sliders are immediately forced together by the action of the pressing levers 65. The spring 68 keeps tension on the pressing lever 65 at all times and insures a proper gripping action of the sliders, notwithstanding variations in the thickness of the fills. The cross bar 147 connects the lower ends of the guides 138' so as to hold them securely in place.

After the fills have been engaged as shown at 131, the sticks must now be released so as to free the opposite ends of the fills for subsequent treatment by suitable operating mechanism. This is accomplished by mechanism as shown in Figs. 4 and 17. The opener member 150 is hinged to one end of the lever 151 and operated by a cam 152 through the medium of a link 153 which is connected to the end of the lever 151. The opener 150 is hinged to the lever 151 and kept under the tension of a spring 154 so that the point of the opener as it enters between the ends of the sliders may yield and follow the rotation of the slider carrier. A spring 155 affords a yielding abutment for the opener 150 so as to compensate for variations in the spacing of the sliders due to the thickness of the fills. When the sliders have been separated, as shown in Fig. 18, the stick is free to fall out. To insure uniform discharge action, however, I provide the kick-out fingers 156 on opposite sides of the machine to engage opposite ends of the sticks. These kick-out fingers are pivoted at 157 and operated by a link 158 and spring 159. The rear end of the kick-out finger is slotted to permit relative free movement of the link 158 during a part of its vertical stroke, which is greater than that required for the action of the kick-out finger 156. As soon as the openers 150 are retracted, the sliders are pushed together again in the manner similar to that previously described. The sticks are positively engaged and detached from the fills by hook-like disengaging members 160 shown in Fig. 19 from which the sticks fall into a chute or bin 161 for future use.

The actual combing or dressing of the fills is accomplished by four card drums 170, 171, 172, and 173. These drums are provided with any suitable form of card cloth, such as 174, having wires or pins with angularly disposed tips such as are commonly employed in carding various textiles. These card drums are arranged in two pairs, as shown in Fig. 1. The construction and mode of operation of drums 170 and 171 correspond, respectively, with those of drums 172 and 173, although the operating mechanism is arranged somewhat differently, as indicated in Fig. 1.

Drum 170 is mounted on a shaft 175 and is driven from the shaft 81 through the chain or belt 176, and the clutch 177. Drum 171 is driven from shaft 81 through the medium of a cross-belt 178. The drum 170 is normally driven clock-wise, as viewed in Fig. 1, for the purpose of combing one side of the fills, and the drum 171 is driven in the opposite direction for the purpose of combing the opposite sides of the fills. When the outer ends of the fills have been combed by the drums 170 and 171, the fills are reversed or turned over by the mechanism heretofore described, so that the inner ends are exposed for a similar combing by the drums 172 and 173. On account of the similarity in the construction and mode of operation of the two sets of drums, I have illustrated and will describe in detail only the mechanism for driving the drums 172 and 173, and removing the laps.

The drum 172 is driven from shaft 81 through the gear train which consists of the spiral gears 83, 84, and 180, shaft 181, bevel gears 182 and 183, shaft 184, chain or belt 185, clutch 186, and shaft 187. The drum 173 is driven from shaft 184 by means of a cross-belt 188. The brush 190 is driven by belt or chain 191, and sprocket 192, which is on shaft 187. The chain 191 passes around an idler sprocket 193 which is carried by a pivot arm 194 having a weight 195 so as to apply tension to the chain and yet permit the brush 190 on the pivot arm 196 to be swung away from the card drum 172 for the purpose hereinafter described. This brush 190 serves normally to transfer fibre from the card drum 173 over to drum 172, and for this purpose the gearing is such that the surface speed of the brush is greater than the surface speed of the drum 173 so that although its contact surface is rotating in the same direction as the contact surface of the drum 173, it will remove from the pins on drum 173 all the fibre which has been combed out from the fills by the drum 173. As the co-operating bristles on the brush 190 and the pins on the drum 172 are rotating in opposite directions, the relative speed is not so important.

Another brush 197 serves to press or pack down the fibre into the pins on the drum 172. This brush is rotated by reason of its contact engagement with the surface of the drum 172, but is mounted on a pivoted lever 198 so that it may be disengaged from or drawn out of contact with drum 172 by means of a cam 199 and link 200. This cam 199 is mounted on a shaft 201 which is driven from shaft 85 by the gear train consisting of spiral gears 202, 203, shaft 204, worm wheel 205, and worm 206 on shaft 201. Lever 198 is connected by a link 207 to an arm 208 on the shaft 209 which carries the arm 196 and brush 190 so that when the brush 197 is disengaged from the drum 172, the brush 190 will be retracted from the drum 172 at the same time.

I have thus far described the mechanism for rotating the drums 172 and 173 so as to comb the fills. When the pins on the drum 172 are loaded or filled with the fibre which has been combed from the fills, it is of course necessary to strip the drum of the material which is commonly termed the lap. For this purpose the drum 172 is rotated backward and the lap removed or stripped. The backward rotation of the drum is effected through the medium of any suitable clutch 186 and cam and link mechanism, as shown in Figs. 19, 20, and 21. Cam 210 is mounted on shaft 201 and driven continuously. The clutch shifting lever 211 is hinged at its lower end and connected by a link 212 which is operated by the cam 210. The clutch 186 has a hub 213 which is keyed to the shaft 187. The clutch member 214 is driven continuously by the chain 185 in a clock-wise direction, as viewed in Fig. 19. The clutch member 215 is driven continuously in a counterclockwise direction by a gear train consisting of a worm gear 216, worm 217, shaft 218, bevel gears 219, 220, shaft 221, and chain 222, which is driven by and in the same direction as the chain 185. The clutch member 186 is movable longitudinally with respect to the shaft 187 but is always rotatively connected to the central hub 213 which is keyed to the shaft. When the clutch member 186 is in the central position, mid-way between the members 214 and 215, it is stationary, but when the clutch member is shifted into engagement either with the clutch member 214 or the clutch member 215, it will be rotated in the direction of the member with which it is engaged. In the particular construction shown, the gearing is so designed as to permit the drum 172 to rotate approximately 260 combing revolutions to about 2 1/2 reverse revolutions for effecting the stripping action. The cams 199 and 210 are so timed with respect to each other that when the drum 172 has completed its combing operation, the packing brush 197 and the transfer brush 190 are disengaged so that they will not interfere with the drum 172 when it begins to rotate backwardly for the stripping operation.

In the particular construction shown in Figs. 1 and 7, it will be seen that the sliders are arranged in 7 groups or sets with spaces 223 between adjacent groups. These spaces allow for the separation of the sliders away from the headers of each set as hereinbefore described, and also provide blank spaces in which the combing drum 172 may rotate backwardly during the stripping operation. In the mechanism shown, the combing drum is intended to hold the combings from five sets or groups of sliders, so that the reverse rotation of the combing drum and the stripping action occurs after each 5/7 of a revolution of the slider carrier or cylinder.

The stripping of the combing drum 172 is effected by a picker or gripper comb 225 and feeding aprons 226 and 227. The gripper consists of a shaft with sharp teeth or prongs, as shown in Figs. 35 and 36. This shaft is carried by bars 228 and 229 mounted on opposite sides of the machine and adapted to reciprocate toward and from the drum 172. These bars 228 and 229 are connected by a cross-bar or bridge 230 which holds them together forming a rigid frame guided in the machine frame. Reciprocation is effected from the shaft 187 through the instrumentality of a rod 231, one end of which is slotted and guided on the end of shaft 187 and the other end of which is connected to an arm 232 connected to the cross-shaft 233. This shaft 233 has gear segments 234 meshing with teeth or racks on the upper edges of the side bars 228 and 229. The cam mechanism for actuating the rod 231 is shown in Figs. 19, 20, 25 and 28. The cam plate 235 has a hub 236 which forms a track for the roller 237 which is mounted on the inner face of the pawl rod 231, which is in tension of the spring 238.

The cam plate has a groove 239 in which the roller 237 is adapted to travel for the purpose of operating the pull-out bar 231. The pawl 240 is pivotally and slidably mounted on a shaft 241 and has its toothed end normally retracted into a recess 242 so that it will not engage the roller 237. The cam plate 235 is secured to the body or housing 243 in any suitable manner, as for instance, by one or more pins or screws 244. This body 243 is keyed to the shaft 187 and supports a sleeve 245 which is adapted to rotate with 243 and also adapted to slide longitudinally thereof. This sleeve carries a bracket 246 which supports the hub of the pawl 240. One end of the shaft 241 is supported in the part 247 of the cam plate and the opposite end of the pawl hub carries an arm 248. A spring 249 connects this arm to the sleeve 245 so that the pawl 240 is under tension of this spring continuously to hold the point of the pawl against the hub 236 of the cam plate. A spring 250 is interposed between the sleeve 245 and the body of the cam 243 so as to hold the parts in the normal position during the combing operation. The housing or body 243 is preferably provided with a slot 251 through which the hub of the pawl 240 passes so as to permit a slight angular adjustment of the cam plate with respect to its housing in order to properly time the operation of the parts. This housing also has a part 252 of the recess necessary to permit the normal retraction of the pawl 240. The sleeve 245 is adapted to be moved toward the cam plate 235 by means of the cam 210 on the shaft 201 and interposed mechanism consisting of an arm 254 (Fig. 23) connected to link 212, a lever 255, sliding shaft 256, and arm 257 which engages in the slot 258 of the sleeve 245. When the cam 210 (see Fig. 23) oscillates the link 212, the extension 254 tilts the lever 255 and reciprocates the shaft 256 with its frame 257 and thus slides sleeve 245 toward the cam plate and forces the pawl 240 into position so that as the cam plate rotates in the direction of the arrow in Fig. 26, the back of the pawl will engage the roller 237 and be forced outwardly during the combing rotation of the drum 172.

When the action of the clutch 186 reverses the direction of the rotation of the shaft 187 and the cam plate 235, the pawl 240 will go between the roller 237 and the hub 236. The continued rotation of the cam plate in a clock-wise direction as viewed in Fig. 26 forces the roller 237 away from the hub 236 and shaft 187 and thus pulls the rod 231 so as to rock the segment 234 and operate the slide frame which carries the gripper 225.

The shaft 256 carries a lever 256' adjacent the rod 231 adapted to be engaged by a projection 231' when the rod is moved inwardly. This rocks the shaft 256 and its arm 257 and lifts the arm 257 from the groove 258 in the sleeve 245. The tension of the spring 250 then pushes the sleeve 245 (toward the right in Fig. 25) so as to pull pawl 240 out of the cam track 247. This prevents the cam and pawl from repeating the pull out of the rod 231 in case the drum 172 should make another backward rotation and thus avoids repeating the action of the pull out gripper or comb 225.

The rod 231 is provided with an extension 259 which is adapted to engage a shoe 260 when the rod is moved to the left, (see Fig. 19). A spring 261 presses the shoe 260 downwardly against the inner end 259 of the rod 231. A lever 262 is adapted to be operated by a projection 263 on the housing 243 so that as the housing and cam rotate and retract the pull-out rod 231, the lever 262 is tilted and the pressure of the spring 261 increases so as to move the shoe 260 downward and thus press the inner end of the rod 231 and thus press the inner end of the rod 231 downward as the outer end 264 of the cam projection 247 engages the roller 237. The slot 265 in the pull-out rod is enlarged at its upper end to permit of this slight depression of the inner end of the pull-out rod by the shoe 260.

The combing drum 172 is provided with a transverse channel or recess 266 in which the ends of the card cloth are secured. This recess forms a channel which is ordinarily bridged by the fibres which have been drawn off in the carding process and the gripper action is timed so as to bring the teeth of the gripper 225 into position to stick into the lap as the channel 266 comes into position opposite the gripper, as shown in Fig. 39. The gripper is mounted in the slide frame so that it can oscillate through approximately 180°. This oscillation is accomplished at the proper time by a train of gears mounted on the inside of the slide bar 228, the last one of which drives gear 225' or the gripper shaft, as shown in Figs. 41 and 42. This train of gears is operated by a member 270 on one of the gears which has an adjustable projection 271 adapted to engage a stop 272 just as the gripper points approach the lap. This tilts the member 270 and rotates the train of gears and causes the teeth or points on the gripper 225 to hook into the lap. This breaks the lap and at the same time engages one end firmly so that as the sliding frame 228 and 229 and gripper 225 are retracted, the lap is drawn out as the drum 172 is rotated counter-clockwise. The pawl 273 under tension of spring 273' serves to snap into notch 270' in the hub of 270 and retain the arm 270 and train of gears connected to the gripper 225 in the gripping position while the gripper is being retracted and the lap drawn out. When the lap has been drawn out to the proper distance, the tail of the pawl 273 engages the shoe 274 which tilts the pawl and retracts it from notch 270' and allows the spring 271' to pull over the gear member 270 and rotate the train of gears so as to return the gripper 225 to the normally inoperative position and release the lap. The shoe 274 and extension 271 are adjustable so as to permit the action of the gripper to be controlled or properly timed.

The draw-out apron 226 is carried by a vertically sliding frame 226' which has its lower shaft mounted in a guide 275 in one or both of the sliding frame bars 228 or 229. As the inclined wall 276 engages the shaft of the lower roller of the apron 226, it lifts the apron so as to separate it from the lower apron 227 and leave a passage for the gripper 225 which must obviously pass above the apron 227 in order to grip the lap on the drum 172. As the lap is drawn out by the gripper 225, the incline 277 engages the shaft of the lower roller of the apron 226 and forces the apron downwardly so as to grip the lap between the aprons 226 and 227. The aprons are driven intermittently from the shaft 221, the timing of the intermittent action being regulated so as to start the motion of the aprons after the gripper has pulled the front end of the lap through beneath the apron 226. The gear 280 on shaft 221 meshes with gear 281 which in turn meshes with gear 282, which is thus driven continuously. The lower apron 227 has a shaft 283 which carries the gear 284, a sprocket 285, and a clutch member 286. The companion clutch member 287 is connected to and rotates with the gear 282 and normally independent of the shaft 283. The clutch shifter 288 is pivoted at its upper end and under the tension of spring 289. This shifter lever 288 carries a roller 290 which normally rests on a wedge-shaped member or cam 291 so that the clutch is normally held in its disengaged position. This cam 291 is rotatably supported on a shaft 292. Normally the cam 291 is stationary in the position shown in Fig. 33, but it is adapted to be disengaged from the roller 290 so as to permit the clutch to be drawn into connection when the gripper slide 228 is oscillated. For this purpose the pull-out slide is provided with a projection 293 near its front end adapted to engage the upper end of a pawl-like member 294 which is pivoted at 295 and provided with a projection or shoulder 296. A bell crank lever 297 is also pivoted at 295 and has one arm connected to a part of the pawl member 294 by a spring 298 and the other part connected to a hook slide 299. When the slide 228 moves to the left in Fig. 33, the projection 293 engages the upper end of the pawl 294 and tilts it sufficiently to allow the projection to snap over the top without acting upon the bell crank 297. As the gripper engages the lap and pulls it through between the bite of the two take-off aprons, the projection 293 on the return movement engages the pawl member 294 and tilts it clock-wise so that the projection 296 operates the bell crank 297 and draws the hook slide 299 to the left so as to disengage the cam 291 from the roller 290 and permit the clutch to be thrown into action so that the take-off aprons are driven with and at the same rate as the lap. In order to continue the take-off movement of the lap, a sufficient length of time to discharge the entire lap and bring its front end up into engagement with the rear end of the previously discharged lap, I have provided mechanism as shown in Figs. 31, 33, and 34.

Gear 300 meshes with gear 284 and has connected to it another gear 301 which meshes with gear 302. The latter is secured to or rotates with a single tooth gear member 303 which co-acts with a "Geneva" stop gear 304 so that the gear 304 rotates once for each 20 revolutions of the apron shaft 283. This gear 304 carries a lug 305 which is adapted to engage the cam 291 and rotate it with the gear 304. The gears are designed so as to bring the cam 291 back again into the position shown in full lines in Fig. 33 after the apron shaft 283 has completed the proper number of revolutions and thus disengage the clutch and stop the take-off aprons.

It should be understood that the lap as delivered from the take-off aprons 226 and 227 may be immediately deposited in a receptacle or otherwise disposed of. In the complete machine, however, I prefer to coil up the lap into a roll or ball, as it is sometimes termed, which can be transferred to another machine for further treatment. As the silk lap has very little strength, I prefer to wind up the lap on a canvas strip 310. The canvas strip to be used is initially wound on a shaft 311 and provided with the frictional brake 312 to control the unwinding. This canvas strip is guided around rolls 313 and 314 which are located adjacent the discharge end of the take-off apron 227. The strip is adapted to be wound up on a roll 315 at the right-hand end of the machine. The lap is delivered from the upper surface of the horizontally disposed apron 227 on to the canvas carrier strip 310 and wound up with the strip on the roller shaft 315. The driving of the carrier strip 310 is so timed that it does not start to move until the front end of the lap delivered from the apron 227 reaches the rear end of the previous lap supported on the canvas strip 310. The strip 310 continues to travel until the rear end of the new strip is free from the apron 227. This driving of the carrier strip 310 is accomplished through a series of gear, chain, and clutch drives.

Sprocket 316, driven by the chain 317 from sprocket 285 when the apron is moving, is connected to gear 318 and rotates freely on the shaft of the strip driving roll 314. Gear 318 drives gear 319 and the single-toothed gear 320, which rotates with gear 319. The "Geneva" stop gear 321 is adapted to be driven by the gear 320. The clutch member 322, which is rotatable with and slidable on the shaft of the driving roll 314, is movable by a shifting lever 323 to engage or disengage a corresponding clutch member which is connected to the sprocket 316. The spring 324 tends to throw the parts of the clutch into engagement. Cam 325 carried by the gear 321 is, however, normally held in position to keep the shifting lever in its unclutched position. The cam 325 is so proportioned and geared that the roller 314 is not thrown into action until the apron 227 has traveled far enough to bring the front end of the lap on to the carrier strip 310. The parts are so designed and proportioned that the driving roll 314 continues to revolve until the rear end of the lap on the strip 310 has cleared the take-up apron 227.

The fluted roll 326 is provided to co-act with the lap on the winding strip 310 above the driving roll 314. The winding roll 315 is driven from a friction clutch 330 and gears 331. One member of the friction clutch is driven by a chain 332 which connects the sprockets 333 and 334. Sprocket 333 is connected to the clutch member 322 so that the roller 315 is driven whenever the roller 314 is being driven. Friction clutch 330 allows the parts to slip somewhat as the material wound on the roll 315 increases in diameter. The friction of the clutch 330 is controlled by the spring 335, the lever 336, link 337, and cam 338. This cam 338 is secured to a ratchet 339 which is controlled by two pawls 340 and 341. Pawl 340 is controlled by an eccentric 342 on the shaft of the gear 321. As the gear 321 is rotated, the eccentric 342 moves the pawl 340 back and forth and thus rotates the ratchet 339 and the cam 338 step by step. This gradually draws the link 337 and rocks the lever 336 so as to increase the pressure of the spring 335 and decrease the friction of the slip clutch 330.

The fluted roller 326 or hold-back has links 343 secured to its opposite ends which hang down as shown in Fig. 31. The lower ends of these links are hinged to arms pivoted at 344, one or both of which has a forwardly projecting portion 345. The weight of these parts tends to hold the roller 326 down against the lap. I may also provide in addition a spring 346 and supplemental arm 347 hinged to arm 345 at one end and connected by a hook or latch 348 near the front ends. By releasing the latch 348 the spring 346 will become ineffective. Lifting up the fluted roller 326 so as to leave space for the tucking in of the front end of a new lap may be readily effected by simply lifting the arm 345. If it is desired to hold the fluted roller in its raised position, a latch 349 may be provided as shown in Fig. 31, to engage the arm 345 when raised.

To facilitate the handling of the lap and insure its proper delivery on to the carrier belt or apron 310, I prefer to provide a tucker 350 and an upper apron 351. (See Figs. 45–47.) The tucker is hinged at its upper edge to an arm 352 which moves up and down with the carrier frame of the apron 226. The lower edge of the tucker is connected by a swinging link 353 supported from one end of the lever 354. The other end of this lever is hinged at 355 to the frame of the machine. Intermediate these ends, the lever has a roller 356 guided in grooves in a cam plate 357. This cam plate is secured to the sliding rack bar 228 which carries the comb or gripper 225. When the frame bar 229 moves to the left in Fig. 45, the cam plate 357 raises the roller 356 and the lever 354, thus lifts up the lower edge of the tucker 350. When the apron 226 is lifted as previously described, the arm 352 lifts up the upper edge of the tucker 350 so that the tucker is carried up out of the way of the gripper 225 as the gripper passes toward the carding or combing drum. When the gripper is retracted it carries with it the front end of the lap of silk as before described. When the gripper is moving to the right in Fig. 45, the tucker is moved downwardly and engages the front end of the lap so as to tear it away or disengage it from the gripper 225 and force it down back of the apron 351 so that the lap can be fed between the two aprons 351 and 227 and thence forwardly into the bite of the carrier 310 and the fluted roll 326.

The other end of the machine is provided with mechanism which is substantially a duplicate of the carding and take-off mechanism heretofore described, the shape and arrangement of the parts, of course, differing somewhat from those at the right hand end of the machine (as viewed in Fig. 1) due to the difference in position and for convenience in handling the material and access for adjustments, etc. As there is no essential difference in the principle of construction, it is unnecessary to either illustrate or describe the same in detail. It will be sufficient to refer to a few elements and show their comparison to the ones previously described. For instance, cam shaft 360 corresponds to cam shaft 201 and is driven from shaft 85 through a train of gears shown in Figs. 1 and 2. Brush 361 serves to transfer fibre from drum 171 to 170. Brush 362 serves to pack the fibre on to the lap roll or card drum 170. The lap is rolled up on the belt 363.

In the operation of the machine the sliders 54 are loaded in the usual way and placed in the drum by hand one after the other. The drum being rotated slowly gradually carries these filled sliders past the card drum 170 which combs one side of the fills. As the fills pass drum 171 which is rotating in the opposite direction, the opposite faces of the fibre are combed in the same way. The material that is collected on the drum 171 is transferred by brush 361 back to drum 170 and the fibre is packed down by the brush 362. As the sliders reach the bottom of the drum as before described in detail, the sliders are separated, the outer ends of the fills drawn in between the sliders and the sticks are discharged. The inner ends of the fills having now become the outer ends are carded by the drum 172 in one direction.

When the ends 131 are drawn up as shown in Fig. 12 the parts of the fibre 102′ which extends around the edge 55′ is left outside so that it is combed again after the sticks 59 are discharged. The width of this edge 55′ determines the length of the fibre which receives the second combing. As the sliders pass the drum 173, the fibre is combed on the other face. The fibre collected on the drum 173 is transferred to drum 172 by brush 190 and packed down by brush 197 on it as before described. As the main cylinder or carrier continues to rotate the sliders again reach the upper part of the carrier and the flag is removed by the operator.

From time to time as the drums 170 and 172 respectively are filled the lap is removed by the gripper or comb 225 as before described in detail.

In the claims I have sought to point out the general features of constructions which in my opinion constitute the important novelties hereby contributed. It should be understood, however, that the claims are intended as suggestive of the various features of importance and that they are not to be construed as limited to the mechanism shown or to the combinations claimed except as specified or as required by the state of the art.

I claim:

1. In a dressing machine, a series of clamping bars for holding ends of fills, a carrier therefor, means for drawing and grasping the other ends of the fills between adjacent bars and means for automatically releasing the first mentioned ends of the fills after the other ends have been grasped.

2. In a dressing machine a series of clamping bars arranged in pairs for holding fills, a carrier therefor, means for separating alternate pairs of said bars, means for automatically drawing the ends of fills between said separated pairs and means for separating the bars of each pair.

3. In a dressing machine, a series of gripping bars for fills, a carrier therefor, means for turning the ends of fills across edges of said bars, and means for automatically engaging said turned ends and drawing them between adjacent bars.

4. The method of dressing silk which comprises dressing one end of a fill while the other end is held on a stick, then clamping the other end of the fill, then releasing the stick and dressing the latter end of the fill.

5. The method of dressing silk which comprises moving a series of fills past dressing combs and treating both sides of one end of each fill, then automatically reversing said fills and dressing the opposite end of each fill and dressing a centrally located portion of the fill a second time.

6. The method of reversing silk fibre in a dressing machine which comprises drawing the free ends of a fill between two bars while the "stick" end is held in position and then releasing the stick end.

7. The method of dressing silk which comprises dressing first one side and then the other side of one end of a fill while the other end is held on a stick, then automatically clamping the dressed end of the fill, then releasing the stick and dressing the latter end of the fill first on one side and then on the other.

8. In a dressing machine a series of clamping bars arranged in pairs, a carrier therefor, means for separating alternate pairs of said bars, means for drawing the ends of fills between said separated pairs, means for separating the bars of each pair and means for discharging the sticks.

9. The combination of a carrier, sliders carried thereby for holding fills, card drums arranged to operate on said fills, an opener for separating sliders, a pick-up means for drawing the ends of fills between sliders, means for releasing the opposite end of the fills, and means for sequentially operating said opener, said pick-up and said releasing means.

10. The combination of a cylinder, sliders carried thereby, opener mechanism for separating the sliders, including a wedge member and means for operating said wedge member in a direction radially to said cylinder and tangentially thereof.

11. The combination of a cylinder, sliders carried thereby, means for separating said sliders, a pick-up member movable radially between said sliders and tangentially, and means for automatically moving said pick-up radially, said pick-up moving tangentially with the cylinder.

12. A slider cylinder for carrying fills, two sets of card drums operable sequentially on the fills, and means for reversing the fills between the sets of drums.

13. A slider carrier, a card drum co-acting therewith to form a lap, a conveyer, and an oscillating gripper for taking the lap from the drum and delivering it on said conveyer.

14. A slider carrier, two card drums, operable in opposite directions adjacent said carrier, means for transferring silk from one drum to the other and means for automatically stripping silk from said latter drum.

15. A slider carrier, two card drums co-acting therewith, one of which operates continuously and means for periodically reversing the other drum and stripping silk from it.

16. The combination of a carrier, a series of sliders carried thereby, card drums co-acting with the silk carried by said sliders, an opener for separating said sliders, pick-up mechanism for drawing the silk between said sliders, means for releasing and discharging sticks from said sliders, and means for sequentially operating said mechanism.

17. The combination of a cylinder, a series of sliders carried thereby, means for separating said sliders, means for drawing silk between said sliders and means for operating said separating and drawing means radially of said cylinder and tangentially thereof.

18. A slider cylinder, two sets of card drums operable sequentially and means for periodically reversing one drum of each set and stripping silk from it.

19. The combination of a cylinder, a series of sliders carried thereby and adapted to carry fills, two sets of card drums operable sequentially adjacent said fills to form laps, means for reversing fills between the sets of drums and means for automatically stripping the laps from said drums.

20. A slider carrier for holding fills, a card drum co-acting therewith to form a lap, a conveyer, an oscillating gripper for taking the lap from the drum and delivering it on said conveyer, and a tucker for pressing the lap from said gripper to said conveyer.

21. The combination of a carding drum, means for rotating it in one direction to comb silk, means for automatically reversing the direction of rotation after a definite number of turns and means for stripping the silk from said drums.

22. The combination of a silk carrier, a drum for carding the silk to form laps, feed aprons for carrying the laps from said drum, a gripper member for taking the laps from the card drum between said aprons and means for separating said aprons to permit the passage of said gripper member.

23. The combination of a card drum for forming laps, upper and lower take-off aprons adjacent said drums, a gripper member moving between said aprons for engaging the lap of said drum and drawing it between said aprons, and a tucker movable between said gripper member and one of said aprons for forcing lap on to the lower apron.

24. The combination of a card drum for forming laps, a gripper member movable to and from said drum for stripping the laps from said drum, and means for periodically oscillating said gripper member and reversing said drum.

25. The combination of a card drum for forming laps, take-off members, a carrier belt, a gripper, and means for starting said belt after said take-off members have carried the front end of a lap from said drum to the rear end of a previous lap on the belt.

26. The combination of a card drum for silk, a horizontally movable take-off apron adjacent thereto, an upper take-off apron at one end thereof, a co-operating apron above the other end of such horizontally movable apron, a tucker, movable between the two upper aprons, and means for drawing the silk from said drum and between the upper and lower aprons.

27. A slider carrier, a pair of oppositely rotatable card drums coacting therewith, a brush for transferring silk from one drum to the other, a packer brush for one drum, means for reversing the direction of rotation of said latter drum, and means for retracting said brushes when said drum is reversed.

28. The combination of a rotating fill carrier having spaced groups of fills, a carding drum rotatable adjacent to said fills, means for rotating said drum in one direction to comb the silk of said fills and means for automatically reversing the direction of rotation of said drum after a definite number of turns and while said carrier rotates and while the space between groups of fills is adjacent said drum.

29. The combination in a silk dressing machine of horizontal and vertical feed aprons, a gripper bar, and means for separating said aprons to permit the passage of said gripper bar between said aprons.

30. In a silk dressing machine, a card drum, take-off aprons, a gripper movable between said aprons, and a vertically movable tucker between said gripper and said aprons.

31. The combination of a rotatable card drum for forming laps, a gripper member movable to and from the drum, means for reversing said drum at intervals, and means for oscillating said gripper to unwind a lap from said drum.

32. The combination of a reversing card drum for forming laps, take-off members, a carrier belt, a gripper for drawing a lap from said drum between said members, and means for starting said belt after said take-off members have carried the front end of a lap to the belt.

33. The combination of a card drum, a horizontal take-off apron for receiving laps from said drum, an upper vertically movable take-off apron at one end of said horizontal apron, a co-operating horizontal apron at the other end, and means for inserting a lap from said card drum between the upper and lower aprons.

34. The combination of a rotating card drum for forming laps, a conveyer belt, means for stripping a lap from said drum and depositing it on said belt and means for operating said belt to wind up the laps from said drum.

35. A carrier cylinder, sliders for holding fills therein, carding means for one end of the fills, means for automatically reversing the fills and discharging the sticks and carding means for the other ends of the fills.

36. A slider carrier for the fills, a pair of oppositely rotatable card drums co-acting therewith, a brush for transferring from one drum to the other, a packer brush for one drum, means for reversing the direction of rotation of said latter drum, means for retracting said brushes when said drum is reversed, means for reversing the fills in said carrier and duplicate card drums, brushes and mechanism for reversing and retracting parts after the fills have been reversed.

HENRY WHITE.